(12) United States Patent
Kikuchi

(10) Patent No.: US 6,518,939 B1
(45) Date of Patent: Feb. 11, 2003

(54) IMAGE OBSERVATION APPARATUS

(75) Inventor: Kumi Kikuchi, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 08/965,142

(22) Filed: Nov. 6, 1997

(30) Foreign Application Priority Data

Nov. 8, 1996 (JP) .......................................... H8-296814

(51) Int. Cl.[7] .......................... G09G 5/00; H04N 13/00; G02F 1/1335; A63F 13/00
(52) U.S. Cl. ...................... 345/8; 345/7; 345/9; 348/51; 348/53; 349/11; 349/13; 349/15; 463/31; 463/44
(58) Field of Search ...................... 348/53, 51; 345/7–9; 463/31–44; 349/11, 13, 14, 15; 359/630, 631, 632

(56) References Cited

U.S. PATENT DOCUMENTS

| | | | | |
|---|---|---|---|---|
| 5,581,271 A | * | 12/1996 | Kraemer | 345/8 |
| 5,708,529 A | * | 1/1998 | Togino et al. | 345/8 |
| 5,808,589 A | * | 9/1998 | Fergason | 345/8 |
| 5,808,591 A | * | 9/1998 | Mantani | 345/7 |
| 5,825,539 A | * | 10/1998 | Hoshi | 345/9 |
| 5,903,395 A | * | 5/1999 | Rallison et al. | 345/8 |
| 5,991,085 A | * | 11/1999 | Rallison et al. | 359/630 |

FOREIGN PATENT DOCUMENTS

| | | |
|---|---|---|
| JP | 4-33679 | 2/1992 |
| JP | 5-180595 | 7/1993 |
| JP | 7-75134 | 3/1995 |

* cited by examiner

*Primary Examiner*—Bipin Shalwala
*Assistant Examiner*—David L. Lewis
(74) *Attorney, Agent, or Firm*—Ostrolenk, Faber, Gerb & Soffen LLP

(57) ABSTRACT

This image observation apparatus comprises: a head-mounted image display unit for displaying images, derived from video signals supplied to itself, on image display units corresponding to observer's left and right eyes respectively; a computer having specifications suitable to production of images displayed on the head-mounted image display unit and including an output part for outputting video signals expressing the images; and a controller being inserted in a signal transmission line between the computer and head-mounted image display unit and performing operator's optional operation regarding supply aspects of the video signals from the computer to the head-mounted image display unit.

2 Claims, 28 Drawing Sheets

SCREEN FRAME

SCREEN FRAME

FIT HEAD-MOUNTED DISPLAY FOR YOUR BEST LOOKING.

SQUARE IMAGES

ADJUST PUPIL DISTANCE OF UNIT SO AS TO BE ABLE TO LOOK AT SQUARES IN FOUR CORNERS.

PICTURE a

PICTURE b

PICTURE c

IMAGE OBSERVATION APPARATUS

BACKGROUND OF THE INVENTION

1. Field of the Invention

The present invention relates to an image observation apparatus, and more particularly, improvement of an image observation apparatus such that it can be easily performed for a small scale apparatus to create three-dimensional (hereinafter, 3D) images and process images of games and so on.

2. Related Background Art

FIG. 44 among drawings incorporated in this application shows an example of work flows for creating motion pictures with using 3D images. First, object data (basic data) is created at process P1, and at the next process P2, an animation work, that is, a motion picture creation work is performed. Subsequently, at process P3, a final rendering work, i.e., a complete motion picture creation work is performed. Motion picture data created at process P3 is recorded on a recording medium or media at process P4 as a recording work. These works are common in this field.

For example, when 3D images are created, the works in the above-mentioned object data creation process (process P1 are shown in FIG. 49. The works contain providing two image-sensing apparatus (camera L and camera R) in line, taking an image of a subject with each camera, and recording a pair of image L and image R in respective recording apparatus (video deck L and video deck R). Then, this recorded pair of images becomes animation data of a live-action having a binocular parallax.

On the other hand, for example, as the works in the object data creation process, two works are performed. The first work of them is to create a pair of images, one image to be played back for a left eye and the other to be done for a right eye, every frame by a computer and the like respectively (so-called computer graphics (CG)). This produced pair of images is made to be animation data, and the next work is to create a final animation on the basis of this data. Further, the pair of animation images having a binocular parallax is recorded on separate recording apparatuses respectively.

With further elaborating, for example, as a procedure for producing 3D images in the CG, first, in an object data producing process P1 shown in FIG. 44, the image data regarding the fundamental skelton of the object is produced in rough polygons, that is, a small number of polygons. In addition, simple color data is also set.

Next, animation data regarding the image data produced in the above-mentioned process P1, is produced in the animation work performed in the process P2. In this work, popular application software for edition of animation and the like are used. After completion of this edition of the animation, the final rendering work is performed in the next process P3.

In the process P3, the final rendering work is performed every screen frame. Thus, with forming a minute shape with a plenty of polygons, setting of proper color data such as texture mapping is performed.

The image data completed in this manner is recorded in the recording work in the process P4. That is, the image data is outputted from a computer for edition to a recording apparatus such as a video deck conforming to a common standard, for example, VHS or β-cam, the image data which is recorded on a recording medium such as a video recording tape by the recording apparatus.

In addition, when a 3D image is produced with using live-action data, its procedure is as follows.

First, it is performed to sense the images of an object. With using two video camera recorders (VCRs) and the like, an image for a right eye that should be played back to only the right eye (hereinafter called an R image) and an image for a left eye that should be played back to only the left eye (hereinafter called an L image) are sensed respectively at the same time.

These images sensed in this manner are played back to left and right eyes respectively with synchronizing the R image and L image with each other. Further, by confirming 3D effects such as an offset quantity (described later), it is checked whether proper 3D images could be sensed. Thus, this confirms whether proper 3D image-sensing was performed. Then, until the recorded images become proper ones, after revising, for example, a sensing position of the VCR, the distance between the VCR and object, and the like, the processes of image-sensing and playback check are repeated. Although these processes are the work corresponding to the process P2 shown in FIG. 44, it is possible to produce a 3D image in only the above-mentioned processes of the image-sensing and playback check in case of live-action data.

Here, 3D images using a binocular parallax will be described below with reference to FIGS. 45–48 among drawings incorporated in this application.

An image for a left eye, referred to as code L in FIG. 45, and an image for a right eye, referred to as code R are images of object data taken or created by supposing the case that a single object, shown as a round object in FIG. 46 is observed by observer's left and right eyes respectively.

If the image for a left eye, L and the image for a right eye, R are played back independently to observer's left and right eyes and are displayed on display means such as an LCD, observer's left and right eyes, as shown in FIG. 46 look at a virtual image screen of display means (LCD etc.) in a playback apparatus. However, in this time, object data on the virtual image screen of the display means, that is, two object data of the image for the left eye, L and the image for the right eye, R can be observed as a single object by being recognized as an identical object (this phenomenon is called "fusion").

In addition, in order to enable an object to be observed as if it protruded in this side, i.e., to enable the object to be observed three-dimensionally, a pair of images L and R of object data are taken or created, the pair of images being composed of an image for the left eye, L and an image for the right eye, R, as shown in FIG. 47. In this case, positions of the two object data composed of the image for the left eye, L and the image for the right eye, R are mutually reversed on a virtual image screen of display means (LCD etc.) as shown in FIG. 48. Owing to this, the object image being recognized as an identical object by observer's eyes is observed as if the object protruded in this side by an offset quantity shown in FIG. 48.

Furthermore, heretofore, taking or creating object data during above-mentioned works for creating 3D images is composed of the following works. The first work is to provide two independent cameras, that is, a camera to take an image for the left eye, L and another camera to take an image for the right eye, R as shown in FIG. 49, in line to a subject. The second work is to record a pair of images (an image for the left eye, L and an image for the right eye, R) taken with respective cameras L and R, in two independent recording apparatuses, that is, a video deck L for recording the image for the left eye, L and a video deck R for recording the image for the right eye, R. These images are recorded on separate recording media, which are used as basic data (animation data having a binocular parallax).

Moreover, reference codes La and Ra shown in FIG. 49 show angles of view of image pickup optical systems for cameras L and R, i.e., ranges where images can be taken, and the angle of view of the camera L, La and the angle of view of the camera R, Ra are set to become approximately equal and to overlap each other. In addition, by providing this overlapped part, 3D sense to a subject included in this range can be obtained.

Furthermore, conventionally, confirmation of 3D images of the object data (basic data) taken or created, and recorded as described above is performed as follows.

Thus, as shown in FIG. 50, for example, the above-mentioned confirmation of the 3D images at the time of creating the images is performed by playing the image for the left eye, L and the image for the right eye, R simultaneously back with two individual video decks L and R keeping synchronization, and outputting respective image signals to two video camera recorders (VCRs) each having a recording and playback function, L and R. Furthermore, respective images L and R are displayed separately for observer's left and right eyes on finder parts for confirmation of the 3D images which are observation means and display means, both of which are provided in these video camera recorders L and R, and each comprise a display unit such as a liquid crystal display (LCD) and a CRT.

In this manner, it is requested to advance production with confirming every time the 3D images are taken or created in the process of creating the object data (P1), the animation process (P2), the final rendering process (P3) and so on as described above in FIG. 44.

There are various items to be confirmed at the time of image production such as what extent of 3D sense is adequate, whether verve is sufficient, and whether the pair of left and right images has parallax to disable images to fuse (excessively large parallax). Further items are whether the balance of offset amounts in the longitudinal direction is adequate among images in former and latter scenes when scenes are connected by editing respective images, and so on.

The above-mentioned requirement, that is, the requirement to advance works with confirmation at the time of image production becomes stronger in the case of using the 3D images to be produced in games, amusements, entertainment, etc., and in particular, in the case of desiring to obtain images having enough presence.

On the other hand, various types of image-sensing apparatuses (systems) for taking 3D images have been proposed.

For example, the 3D image-sensing apparatus disclosed in Japanese Unexamined Patent Publication No. 7-75134 comprises a camera apparatus composed of a pair of left and right small cameras, a controller for controlling the position of this camera apparatus, a monitor unit for displaying images taken with the camera apparatus respectively, etc.

In addition, the monitor unit is provided with a pair of small monitors respectively displaying the images from the pair of left and right small cameras, and eye-cups internally having lenses to enlarge the images taken with the camera apparatus and to enable an observer to observe 3D images.

Furthermore, the camera apparatus can be moved in the up and down directions and the left and right directions by the controller, and hence, an observer can easily observe images in the desired direction by controlling the position of the camera apparatus with the controller.

On the other hand, recently, so-called computer games, each of which is run by displaying a motion picture on a screen of a TV set, or a display unit of a personal computer (PC) and the like (hereafter, a display and the like) have been in the market.

These games have various types of content. For example, as shown in FIG. 51, a game has a long screen frame, a displayed screen scrolls vertically (Y arrow directions shown in FIG. 51), and the game proceeds, for example, by shooting down enemy fighters in turn. Another game, as shown in FIG. 52 has a wide screen frame, a displayed screen scrolls horizontally (X arrow directions shown in FIG. 52), and the game proceeds, for example, by falling enemy characters in turn.

Therefore, conditions such as an optimal screen frame size, and an aspect ratio of the screen are different every game, the conditions being not only for most enjoying each game but also for producing better comfortableness and presence.

In addition, in a game where emphasis is put on speed sense, the game can be sufficiently enjoyed even if CPU's processing is set for speed to acquire the priority and quality of display images is set low. However, in a game where emphasis is put on contents of the game (story) and/or display images of game characters including motion pictures themselves, it is better for further enjoying the game to set the display images at precise images.

Then, when each of various types of game software is created, it is desirable to use a display and the like for confirming images, which are similar to the display and the like for playing the game, regarding a screen frame size, an aspect ratio, picture quality, etc.

However, presently, in case of home video games that are enjoyed personally at usual home, it is common to use home TV sets as displays and the like for them. Owing to this, it is usual that the screen frame size, aspect ratio, picture quality and the like cannot be set and changed in conditions suitable to contents of various types of games. Therefore, various types of current game software are produced with scarcely considering change of various parameter settings.

On the other hand, in order to make it possible to enjoy any types of games, a dedicated display and the like, having a high resolution screen and a large screen frame, may be provided. However, since this type of display is extremely expensive and also requires a broad space, this is not practical.

Above problems are common not only at home, but also in amusement parks, gaming centers, and development sites of game software.

Then, recently, head-mounted types of display units such as so-called head-mounted displays (HMDs), each of which is mounted on observer's head with the display covering from his/her head to his/her face, have been proposed as small-sized displays for displaying images and using for various types of games.

For example, a display for games, disclosed in Japanese Unexamined Patent Publication No. 4-33679 comprises an image projection unit and a light path changing member (mirror) arranged for directing image display light, projected from this image projection unit, toward a predetermined direction. Furthermore, the image projection unit comprises: optical image display means having a display screen to display images corresponding to image signals from the main frame of a game machine; and an optical member to project the image display light projected from the display screen toward the light path change member (mirror).

According to this, it becomes possible to be absorbed in the world of games (atmosphere) since surrounding unnecessary information can be cut off. Moreover, it is also possible to reduce eye fatigue and lowering of vision by adaptively keeping the distance between eyes and display images.

In addition, a shooting toy, disclosed in Japanese Unexamined Patent Publication No. 5-180595, comprises a mock gun, a goggle, and a cable transmitting signals between the mock gun and the goggle. Its control means judges hitting on the basis of a trigger signal from the mock gun and the status of a signal received by infrared ray receiving means. Meanwhile, the control means judges that the game player is hit when the infrared ray receiving means of the goggle receives a predetermined infrared signal, and then, the control means makes the display means display information of hitting, being hit, etc. on a part of glass in the goggle.

However, as described above, during producing the 3D images, if two separate image-sensing/playback apparatuses are used, the confirmation and revision of the once-recorded images must be performed by operating the two separate image-sensing apparatuses simultaneously, and hence, this toy has a problem that this requires time and labor for performing the creation work of the object data.

Furthermore, in order to take an image similar to an object image when an observer looks at the object with naked eyes, it is necessary to arrange two cameras L and R so that the pupil distance, that is, the distance between both eyes may be approximately equal to the space between two cameras L and R (base-line length; normally, the base-line length is set nearly 50–70 mm and the average length is 65 mm) for taking the image. Furthermore, it is also necessary to install two cameras L and R so that the installed angles of two cameras L and R may meet with the angle of convergence of eyes, when the observer looks at the object image with naked eyes, that is, the angle within which observation ranges of left and right eyes overlap each other.

Obtaining such fine 3D images requires many setting items of image-sensing conditions regarding the arrangement of two cameras L and R for sensing images. Hence, this toy has another problem that, if two image-taking cameras are separate, setting of the image-sensing conditions becomes especially complex.

In addition, if the 3d images in production are confirmed, the finder parts of two video camera recorders L and R separately located are arranged, as conventionally performed. However, this has still another problem that it is extremely difficult to achieve the arrangement due to mutual physical interference of both arranged finder parts.

Furthermore, this has a further problem that observing or confirming the 3D images with a conventional liquid crystal shutter (hereinafter, an LC shutter) type of eye glasses requires a special work of recording the 3D images L and R again for converting to field-sequential images, and hence, this is inefficient due to consumption of time and cost.

Still more, a system, comprising cameras, video decks, etc. (refer to FIG. 50), for observation (confirmation) of the 3D images is composed of the system which is different from units for production of the 3D images such as a computer. Therefore, for confirming the 3D images produced by this computer and the like, it is necessary to move from the installed position of the computer and the like for production of the images to the display units fixedly installed at the different position, that is, the finder parts of the cameras L and R (refer to FIG. 50). Hence, this has an additional problem that working efficiency decreases.

Furthermore, since this requires two image-sensing apparatus, the entire system becomes large, and hence, this has another problem that it is difficult not only to keep a location for installing the system including two image-sensing apparatus, but also to carry and use the system.

Moreover, according to means disclosed in Japanese Unexamined Patent Publication No. 7-75134, its structure becomes large similarly to that of the image-sensing apparatus exemplified in FIG. 49 and the observation system exemplified in FIG. 50. Therefore, it is difficult to carry and use this apparatus, and hence, it seems that object data can not be easily created using this apparatus.

In addition, if it is performed to create and process an image for the left eye and an image for the right eye separately using two separate computers, it becomes necessary to take a pair of left and right created images with two image-sensing apparatuses. Therefore, this apparatus may become a larger system.

On the other hand, a head-mounted display and the like disclosed in the above-mentioned Japanese Unexamined Patent Publication No. 4-33679 and Japanese Unexamined Patent Publication No. 5-180595 do not display information about adequate screen frame and the like corresponding to the contents of various types of games. However, these displays are dedicated ones to respective games, and hence, in these specific games, these displays can be used optimally. However, if they are used in other games, presence in the games may be insufficient, and comfortableness of playing the games may be reduced.

In addition, a head-mounted display can be easily used as a small display for playing various types of games, a display for confirming images at the time of creating various types of game software, and the like. However, since it is impossible to see the surrounding status with wearing this type of head-mounted display, it is difficult and complex to perform various settings of this display itself such as adjustment of the pupil distance and adjustment of visibility, etc. This is another problem.

Furthermore, if a game player does not understand or does not know how to operate the game to be started, the player can not refer to its operation manual with wearing this head-mounted display, which is an additional problem.

Still more, if an unexpected accident such as power failure when a game is being played, the game in progress will be interrupted at that time. Therefore, the progress status and results of the game just before the power failure may be deleted without being stored in a recording medium such as memory.

SUMMARY OF THE INVENTION

It is a first object of the present invention to provide an image observation apparatus that not only can easily confirm 3D images when the 3D images are created, but also can display the images on a large screen, and further that is small and has superior portability.

In addition, it is a second object of the present invention to provide an image observation apparatus that can be easily set and modified (for example, on an aspect ratio, picture quality, etc.) when display images of a game and the like are displayed.

Further more, it is a third object of the present invention to provide an image observation apparatus that can be easily set on the apparatus itself such as adjustment of a pupil distance and adjustment of visibility even if a head-mounted display is worn.

Still more, it is a fourth object to provide an image observation apparatus that does not require an operation manual after wearing a head-mounted display by displaying the operation method of a game to be started on the image display unit of the image observation apparatus.

Moreover, it is a fifth object of the present invention to provide an image observation apparatus that can securely protect the progress status and the like of a game when power supply to the apparatus is interrupted during using the apparatus for a game and the like.

In short, an image observation apparatus according to the present invention is characterized in comprising: a head-mounted image display unit (HMD) for displaying images, derived from video signals supplied to itself, by an image display unit corresponding to observer's eyes; a computer having specifications suitable to the production of images displayed on the head-mounted image display unit, and including an output part for outputting an video signal expressing the images; and a controller being inserted in a signal transmission line between the computer and the head-mounted image display unit and performing operator's optional operation regarding supply aspect of the video signals from the computer to the head-mounted image display unit.

Therefore, the head-mounted image display unit of the image observation apparatus according to the present invention displays images, derived from video signals supplied to itself, by the image display unit corresponding to observer's eyes; the computer produces images to be displayed by the head-mounted image display unit and outputs the video signal expressing the images from the output part; and the controller is inserted in the signal transmission line between the computer and the head-mounted image display unit and performs operator's optional operation regarding supply aspect of the video signal from the computer to the head-mounted image display unit.

In addition, an image observation apparatus according to the present invention is characterized in comprising: a head-mounted image display unit for displaying images, derived from video signals supplied to itself, by an image display unit corresponding to observer's eyes; and a controller being capable of selectively mounting a recording medium storing image data having a binocular parallax, performing operator's optional operation to image data read from the mounted recording medium, and supplying a video signal, corresponding to the image data performed the operation, to the head-mounted image display unit.

Therefore, the head-mounted image display unit of the image observation apparatus according to the present invention displays images, derived from video signals supplied to itself, by an image display unit corresponding to observer's eyes; and the controller can selectively mount a recording medium storing image data having a binocular parallax, performs operator's optional operation to image data read from the mounted recording medium, and supplies a video signal, corresponding to the image data performed the operation, to the head-mounted image display unit.

These and other objects and advantages of the present invention will become more apparent from the following detailed description.

According to the present invention, it is possible not only to easily confirm 3D images when the 3D images are created, but also to display the images on a large screen, and further, to provide an image observation apparatus having a small shape and excellent portability.

In addition, according to the present invention, it is possible to provide an image observation apparatus facilitating various settings and changes such as an aspect ration and picture quality when images of games and the like are displayed.

Furthermore, it is possible to provide an image observation apparatus facilitating various settings of the apparatus itself such as adjustment of a pupil distance and a parallax even if a head-mounted display is worn.

Still more, it is possible to provide an image observation apparatus not requiring to refer to an operation manual after wearing a display unit by making an image display part of the image observation apparatus display operation methods for a game to be started.

In addition, it is possible to provide an image observation apparatus capable of securely protecting the progress status of a game if power supply to the apparatus is interrupted when the apparatus is used for the game.

DETAILED DESCRIPTION OF THE PREFERRED EMBODIMENTS

Figure 1:
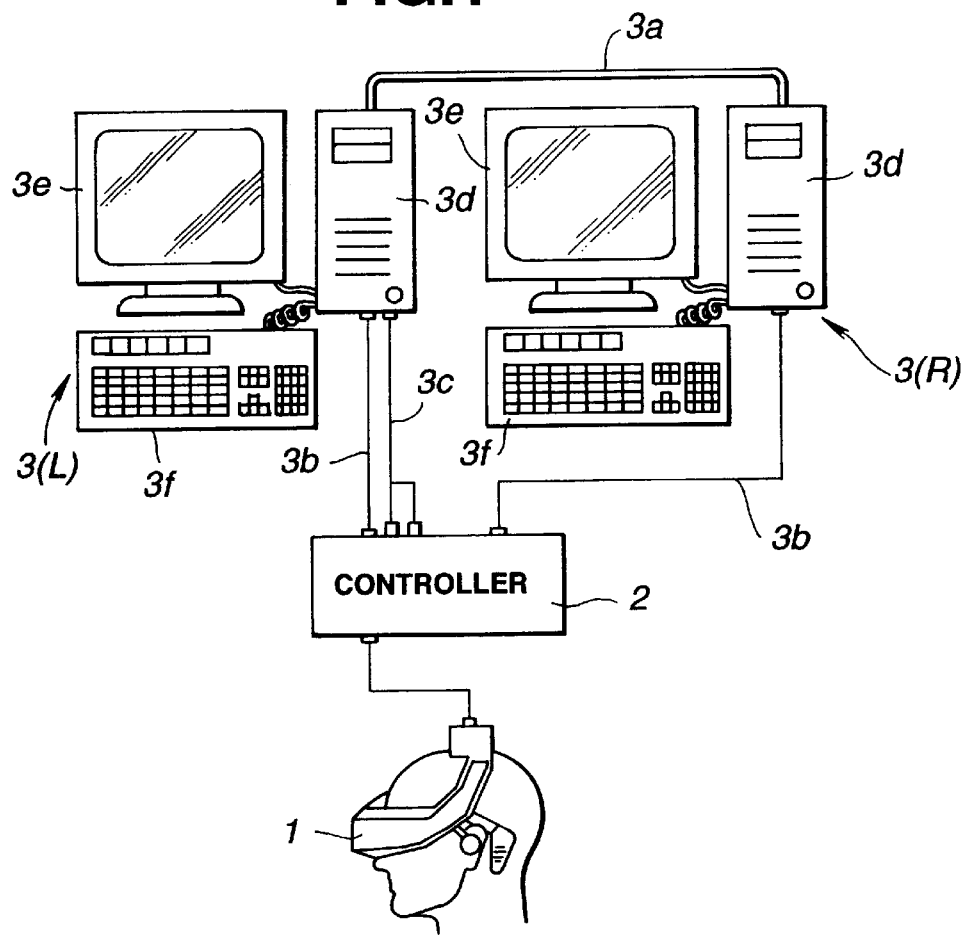
FIG. 1 is a schematic diagram showing the structure of a first embodiment according to the present invention.

FIG. 1 is a schematic diagram showing a first embodiment of an image observation apparatus according to the present invention. The below-described first embodiment of the image observation apparatus is an example of producing 3D images and confirming the 3D images created during this production work, using this image observation apparatus.

Thus, this image observation apparatus comprises: a head-mounted image display unit 1 that is made to display images, derived from video signals supplied to itself, respectively on an image display unit corresponding to observer's eyes; a computer 3 (L and R) having specifications suitable to the production of images displayed on the head-mounted image display unit 1, and including an output part for outputting video signals expressing the respective images; and a controller 2 being inserted in a signal transmission line between the computer 3 and the head-mounted image display unit 1 and performing operator's optional operation regarding supply aspects of the video signals from the computer 3 to the head-mounted image display unit 1.

The above-mentioned computer 3 are composed of two sets of computers, that is, a computer 3L mainly processing a video signal for a left eye, and a computer 3R mainly processing a video signal for a right eye, both video signals being included in video signals forming the 3D images. These computers 3L and 3R are network-linked with a cable 3a. In addition, the specifications of the computers 3L and 3R are approximately similar.

The computer 3 (L and R) comprises: a computer mainframe 3d having a control circuit and the like constructed with a CPU and so on; a display 3e that is display means for a work for displaying a video signal; and a keyboard 3f that is command input means for inputting a command and the like to the control circuit in the computer mainframe 3d by operator's optional operation. Further, a video signal (for example, S-Video signal, VGA signal, etc.) outputted from the computer mainframe 3d is outputted to the controller 2 via a cable 3b whose terminal is connected to an output part.

In addition, a video signal is outputted from the output part of the computer 3 (L and R) to the controller 2 while synchronization of output timing of video signals for left and right eyes is secured by a timing controller that is a sync circuit provided in the computer 3 (L and R).

Furthermore, an audio signal is also outputted from the computer mainframe 3d to the controller 2 via a cable 3c whose terminal is connected to the output part of the computer mainframe 3d. Still more, this audio signal may be outputted from the computer mainframe 3d of either the computer 3L or the computer 3R. Because, the computers 3L and 3R are network-linked. FIG. 1 shows a case that the cable 3c for transmitting the audio signal is connected to the computer 3L.

In addition, the computer 3 (L and R) has built-in software for various types of image processing (not shown) such as modeling software for creation of original images (basic data), software for edition and production of original images, and rendering software for edition and production of final images. Furthermore, large size of memory (not shown) is securely kept so as to perform above-mentioned image processing, that is, various types of calculation and data processing.

Further, the above-mentioned rendering software can perform the following processing for original image data (basic data) of an object produced by modeling software:

1) Polygon; A figure that is expressed by triangles, into which 3D data is transformed in computer graphics (CG) and the like.

2) Solid model; one of 3D expressions in CG, also having data of contents surrounded by 3D planes.

Thus, for example, when the original image data of an object is processed as 3D images using rendering software, it is possible to display the object from various points of view, and hence, it is possible to freely express the object according to camera angles and positions of the object.

Figure 3:
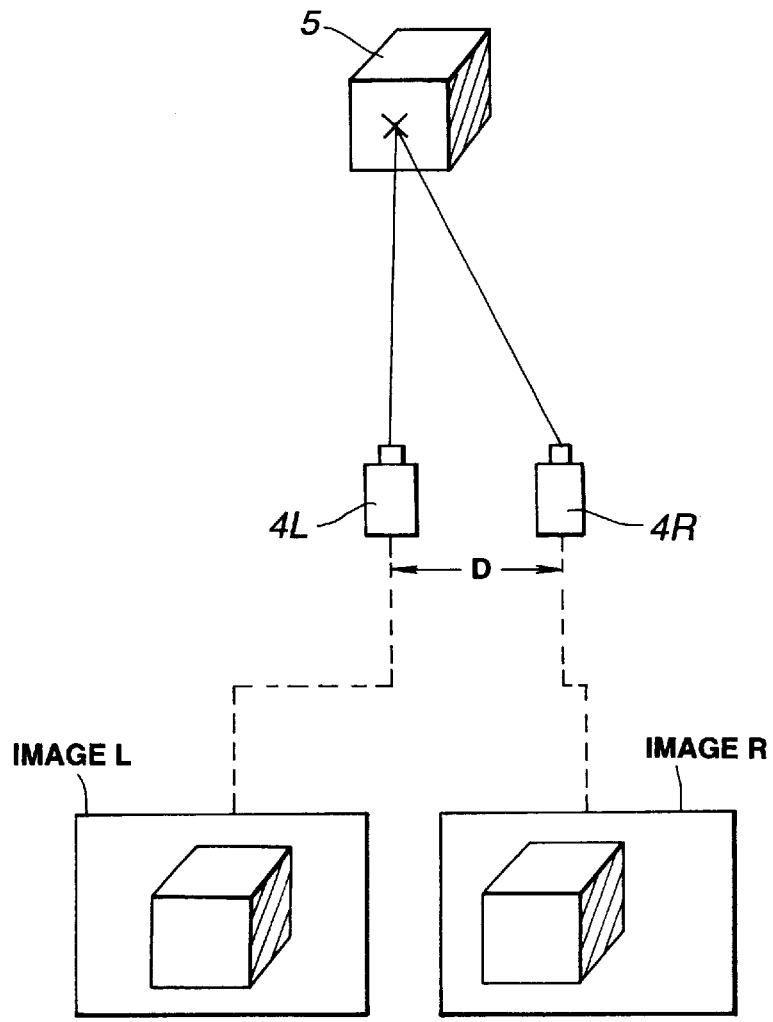
FIG. 3 is a conceptual drawing for explaining parameters set in rendering software.

Further elaborating, as shown in FIG. 3, if profile (image) data of an object 5 is created to create 3D images, assume that images of the object 5 are sensed with, for example, two image-sensing apparatuses (cameras) 4L and 4R arranged side by side. Then, a pair of images, that is, image data for the left eye, L and image data for the right eye, R are created, the pair being obtained respectively by image-sensing apparatuses (cameras) 4L and 4R virtually installed.

Figure 4:
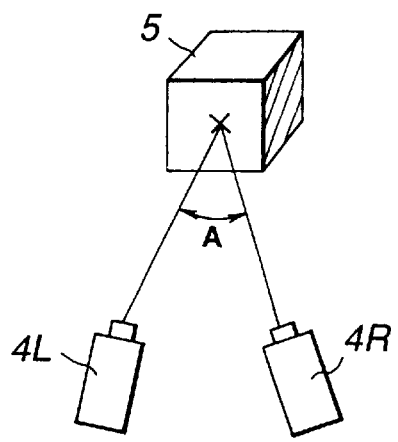
FIG. 4 is also a conceptual drawing for explaining parameters set in rendering software.

In this case, in the above-mentioned rendering software, a user can optionally set an observation point (camera angle, etc.), a point of regard (distance to the object), the distance between cameras (base-line length; reference code D shown in FIG. 3), an installation angle of cameras (angle corresponding to an angle of convergence of both eyes; reference code A shown in FIG. 4), and the like.

In addition, the gap between the virtual cameras 4L and 4R (base-line length D), as described above, is usually set to be nearly 50–70 mm (average: 65 mm). Because this number is an average value of human pupil distances, and by setting the gap between cameras in this manner, it becomes possible to obtain natural image data similar to naked eyes.

In this manner, the above-mentioned rendering software can express various types of 3D image sense by making the observation points, the installation angle, and the like of the virtual cameras 4L and 4R parameters.

Figure 2:
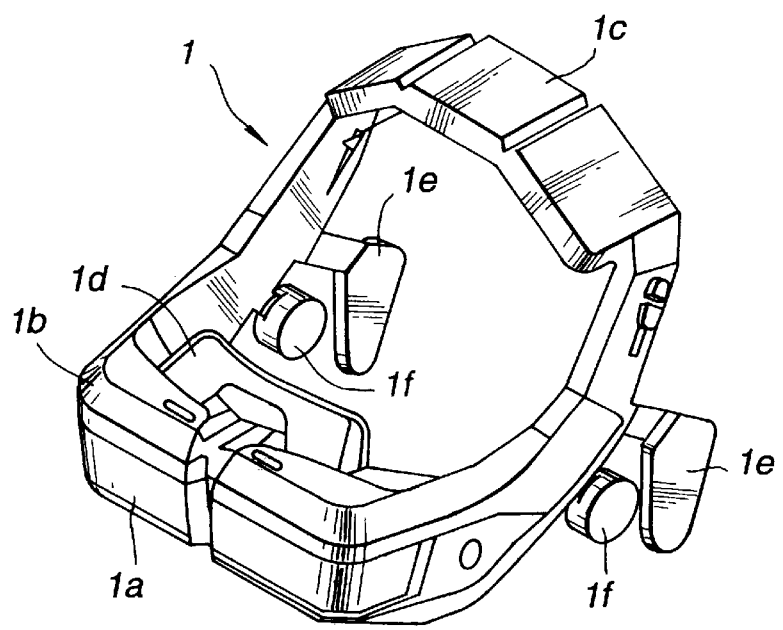
FIG. 2 is a schematic perspective view showing appearance of a head-mounted image display unit used for the image observation apparatus shown in FIG. 1.

FIG. 2 is a schematic perspective view showing appearance of a head-mounted image display unit used for a first embodiment of an image observation apparatus.

As shown in FIG. 2, the head-mounted image display unit 1 comprises: a member for image display, 1a, that is, a body incorporating an image display unit and the like; a frame part 1b connected to this body 1a; a forehead pressing part 1d being a supporting part provided on an upper front central part of the body 1a; a head band 1c being a supporting part provided in a side contacting to a head; a temple supporting part 1e projecting from the vicinity of a position, where the frame part 1b is connected to the body 1a, to both temples being rear sides of both ears, and being supporting parts having leaf springs being elastic members; and speakers 1f being prolonged from the vicinity of the front portion of the base edge of this temple supporting part 1e to the downward slanting and backward direction and being provided at positions facing to both ears.

An image display unit corresponding to observer's eyes and having LCDs is provided in the body 1a. This image display unit displays images derived from video signals outputted from the output part of the computer 3 (L and R) to the head-mounted image display unit 1 via the controller 2 (details will be described below).

Regarding the above-mentioned image display unit, a pair of image display units is formed separately for a left eye and a right eye respectively. Therefore, video signals for the left and right eyes are displayed on respective image display units separately.

In addition, the head-mounted image display unit 1 has a so-called see-through function that makes it possible to selectively switch the images displayed on the image display unit and the outside world. This see-through function has two operation modes as follows. A first operation mode is for observing the images, derived from the video signals to this head-mounted image display unit 1, with shutting off the field of view to the outside world. In addition, a second operation mode is for securing only the field of view to the outside world. Furthermore, this function can selectively use these two modes.

Thus, this function makes it possible to selectively see the images and the outside world by making an liquid crystal (hereinafter called LC) shutter (not shown in FIG. 2) in the head-mounted image display unit 1 shut off or changing the transparency of the image display unit by adjusting the degree of open-close of the LC shutter. Therefore, by making this function effective, it becomes easy to perform other operation even if this head-mounted image display unit 1 is worn.

On the other hand, as described above with referring to FIG. 1, the controller 2 is inserted in the signal transmission line between the computer 3 (L and R) and the head-mounted image display unit 1. In addition, the video signals and the audio signal outputted from the output part of the computer 3 (L and R) are inputted to the controller 2 via cables 3b and 3c.

Furthermore, this controller 2 can switch the supply modes of the video signals, inputted from the computer 3 (L and R) to the head-mounted image display unit 1, by operator's optional operation. Here, the switchable supply aspects of the video signals to the head-mounted image display unit 1 are, for example, as follows:

1) A mode for displaying only the images derived from the video signal for a left eye on both display units for left and right eyes.
2) A mode for displaying only the images derived from the video signal for a right eye on both display units for left and right eyes.
3) A mode for displaying the images derived from the video signal for a left eye on the image display unit for a left eye, and displaying the images derived from the video signal for a right eye on the image display unit for a right eye, respectively.

Still more, the controller 2 is provided with a signal converter converting the video signals for left and right eyes, inputted from the computer 3, to signals displayed respectively on the image display units for left and right eyes in the head-mounted image display unit 1. This signal converter will be described below with reference to the block diagram of FIG. 6.

In addition, signal conversion performed by this signal converter is, for example, conversion of an interlaced signal to a non-interlaced signal.

Figure 6:
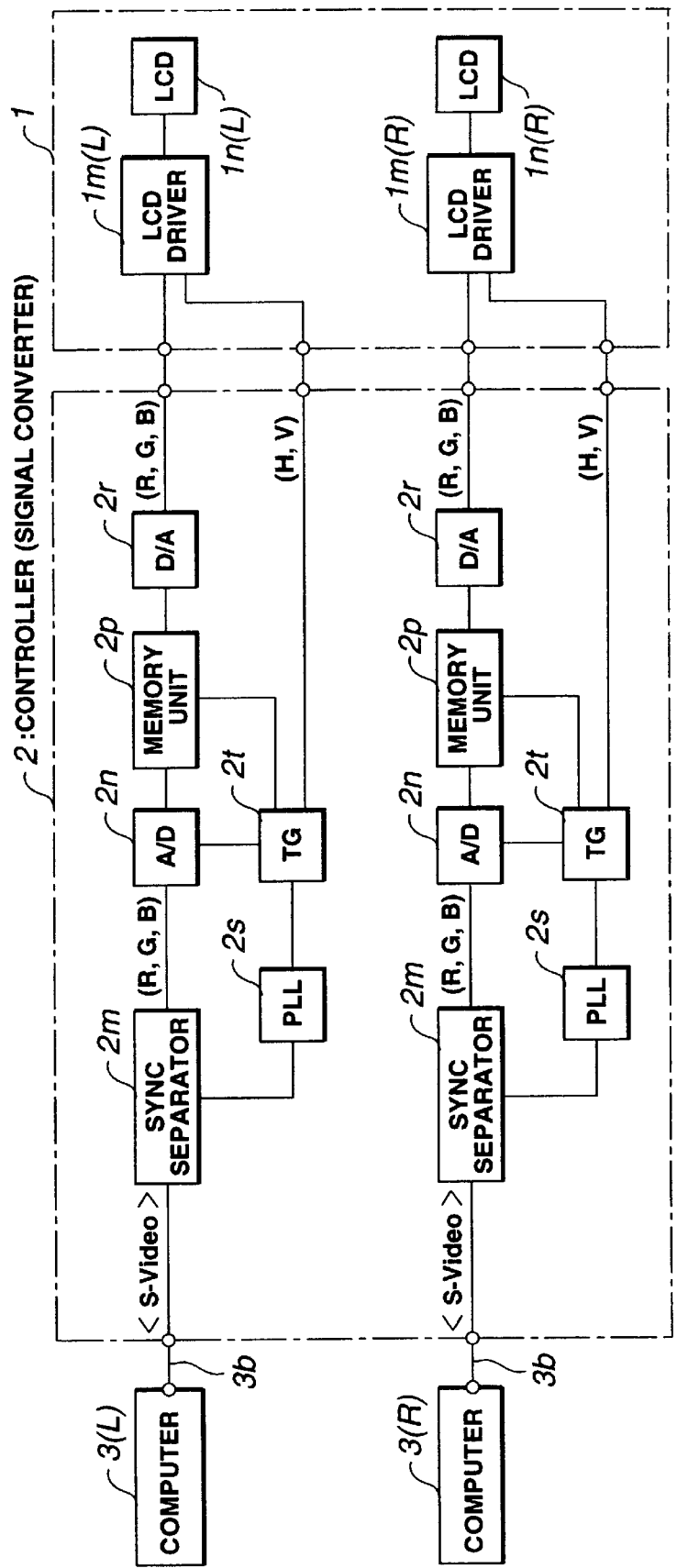
FIG. 6 is a block diagram showing a signal converter in a controller which is used for the image observation apparatus shown in FIG. 1.

As shown in FIG. 6, the video signals for left and right eyes (S-Video signals are exemplified in FIG. 6), which are inputted from the computers 3 (L and R) to the controller 2, each are divided into a set of RGB signals and a sync signal by each sync separator 2m in the signal converter.

Furthermore, after each set of RGB signals is converted from analog signals to digital signals by an A/D converter 2n, the set of RGB signals is stored in a memory unit 2p including frame memory. On the other hand, each sync signal is stored in the memory unit 2p after it is inputted to a TG (timing generator) 2t through a PLL (phase-locked loop) 2s. Simultaneously, the signal is supplied to an LCD driver 1m (L and R) of the head-mounted image display unit 1 as an H (horizontal clock) signal and a V (vertical clock) signal.

Then, the video signals stored in the memory unit 2p are outputted to the LCD driver 1m (L and R) after they are converted from the digital signals to the analog signals with a D/A converter 2r.

Thus, the above-mentioned TG 2t controls the timing when the video signals inputted are read from and written to the memory unit 2p.

In addition, the above-mentioned signal converter in the controller 2 is composed of two signal converter respectively for left and right eyes, and they separately process video signals for left and right eyes respectively. Therefore, it is possible to display the video signals, which are outputted from the computers 3 (L and R), as 3D images on the image display units (LCD) in of the head-mounted image display unit 1, if the timing controller in the computers 3 outputs the video signals to the controller 2 by securing synchronization of the output timing within the allowance of one frame.

Furthermore, in FIG. 6, signal lines between the head-mounted image display unit 1 and the controller 2, that is, signal lines of video signals (RGB signals) for left and right eyes and synchronous signals corresponding to them, i.e., H and V signals are shown separately. However, these signal lines can be gathered in a cable.

Playback operation for confirming the produced 3D images, which is performed during producing the 3D images in the first embodiment of the image observation apparatus constructed in this manner, will be simply described below with reference to the flow chart of FIG. 5.

Figure 5:
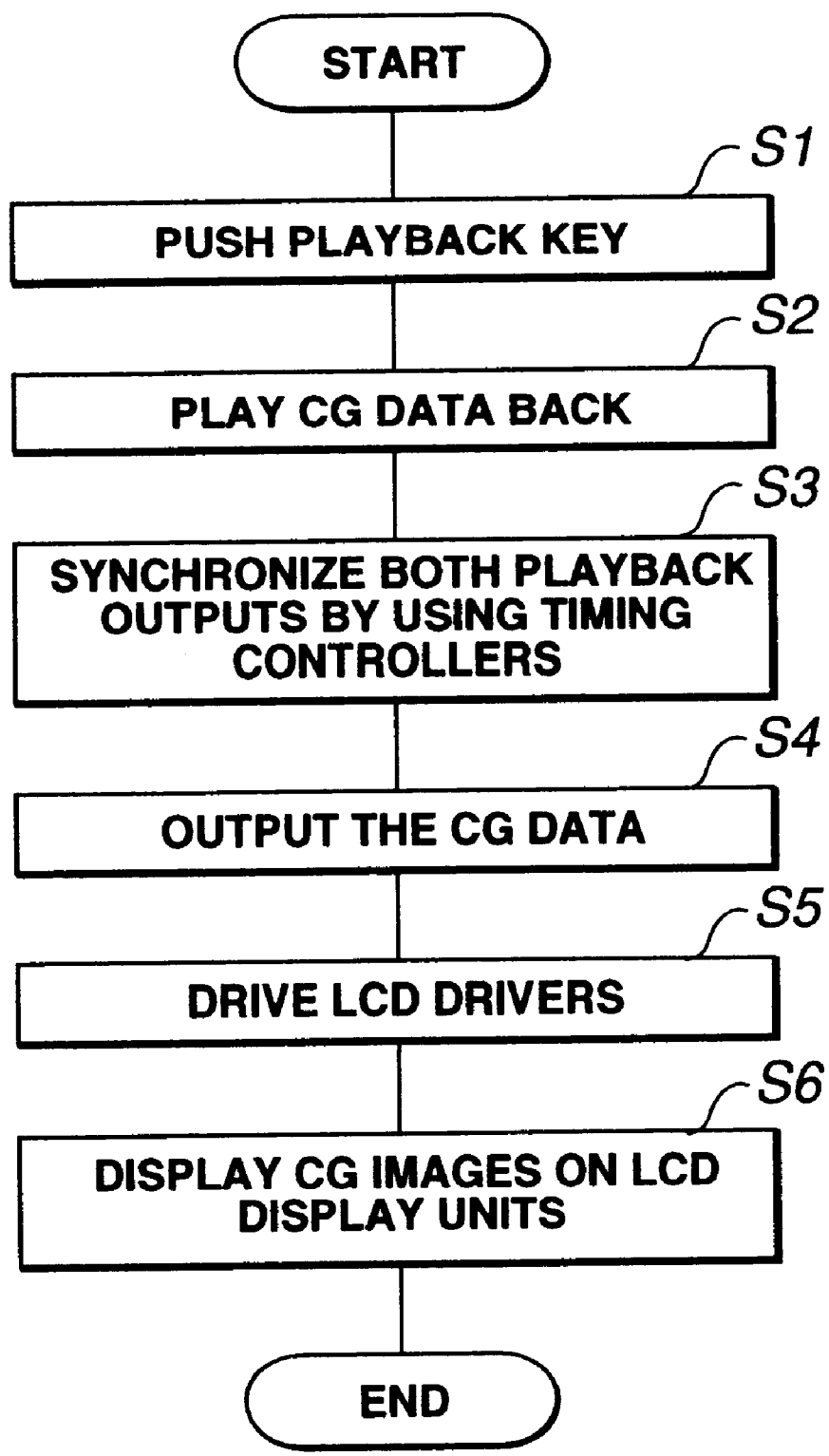
FIG. 5 is a flow chart showing a process of playback operation when 3D images created are confirmed during production of the 3D images using the image observation apparatus shown in FIG. 1.

As shown in FIG. 5, first, a playback command is inputted by an operator to the computer 3 through a keyboard 3f for either of the computers 3L or 3R at step S1, the command being used for playing image data derived from the desired video signals, for example, CG data back. Then, the process goes to the next step S2.

Here, the computers 3L and 3R are network-linked as mentioned above, and hence, if the playback command is inputted from either keyboard 3f, the playback command is sent also to the other computer 3R (or 3L) through the present computer 3L (or 3R). Therefore, the computers 3L and 3R become as if the playback command were inputted to them simultaneously.

Next, the computer 3 starts playing the image data (for example, CG) derived from the desired video signals, that is, outputting the images played back from respective video signals for left and right eyes, at step S2. Then, the process goes to the next step S3.

When the image data derived from video signals are played back at step S2, the playback outputs of respective video signals for left and right eyes are synchronized with each other on output timing at step S3 by the timing controller (not shown) that is a sync circuit provided in the computer 3. Then, the process goes to the next step S4.

At step S4, the output part of the computer 3 outputs the image data (CG data) derived from the video signals to the controller 2 as, for example, S-Video signals, and then, the process proceeds to the next step S5.

The video signals (S-Video signals) outputted from the computer 3 at step S4 are inputted via the controller 2 to the head-mounted image display unit 1 at step S5. Then, the LCD drivers driving the image display units of the head-mounted image display unit 1 are driven, and the process goes to the next step S6.

In addition, after the LCD drivers make the image display units of the head-mounted image display unit 1 display the images derived from the desired video signals at step S6, a series of steps is completed (END).

As described above, according to the first embodiment, the image display apparatus, which is display means for displaying images, are head-mounted. Therefore, it is possible for a small-sized system to display the images on a large screen, and also to provide the image observation apparatus having a small shape and excellent portability.

Furthermore, it is possible to easily perform the confirmation work of the produced 3D images, which is executed during production of the 3D images, without interrupting the image production work.

Still more, since the head-mounted image display unit 1 has the see-through function, it is possible to optionally switch the field of view to the outside world and the image display easily, when image production work is performed. Thus, by switching the head-mounted image display unit 1 to the second mode with wearing this head-mounted image display unit 1, it becomes possible to secure the field of view to the outside world. Hence, it becomes also possible to perform various works such as operation of the keyboards 3f, and image confirmation on the displays 3e during a work. On the other hand, by switching the head-mounted image display unit 1 to the first mode, it becomes possible to easily shut off the field of view to the outside world, and to instantly confirm the produced 3D images. Therefore, this embodiment can contribute to increase of the work efficiency.

In addition, since the timing controller, which is a sync circuit, is provided in the computer 3, video signals for left and right eyes, which are outputted from the output part of the computer 3, are securely synchronized with each other and outputted. Hence, fine display images can be observed.

Furthermore, in the above-mentioned first embodiment, two signal converters are separately provided in the controller 2 for separately processing respective video signals for left and right eyes. However, so as to construct the controller 2 in low cost, it is conceivable to construct each timing control circuit (PLL and TG are corresponding to this in FIG. 6) in a single circuit, and further to adopt field memory, which is cheaper than the frame memory, as memory units.

Figure 7:
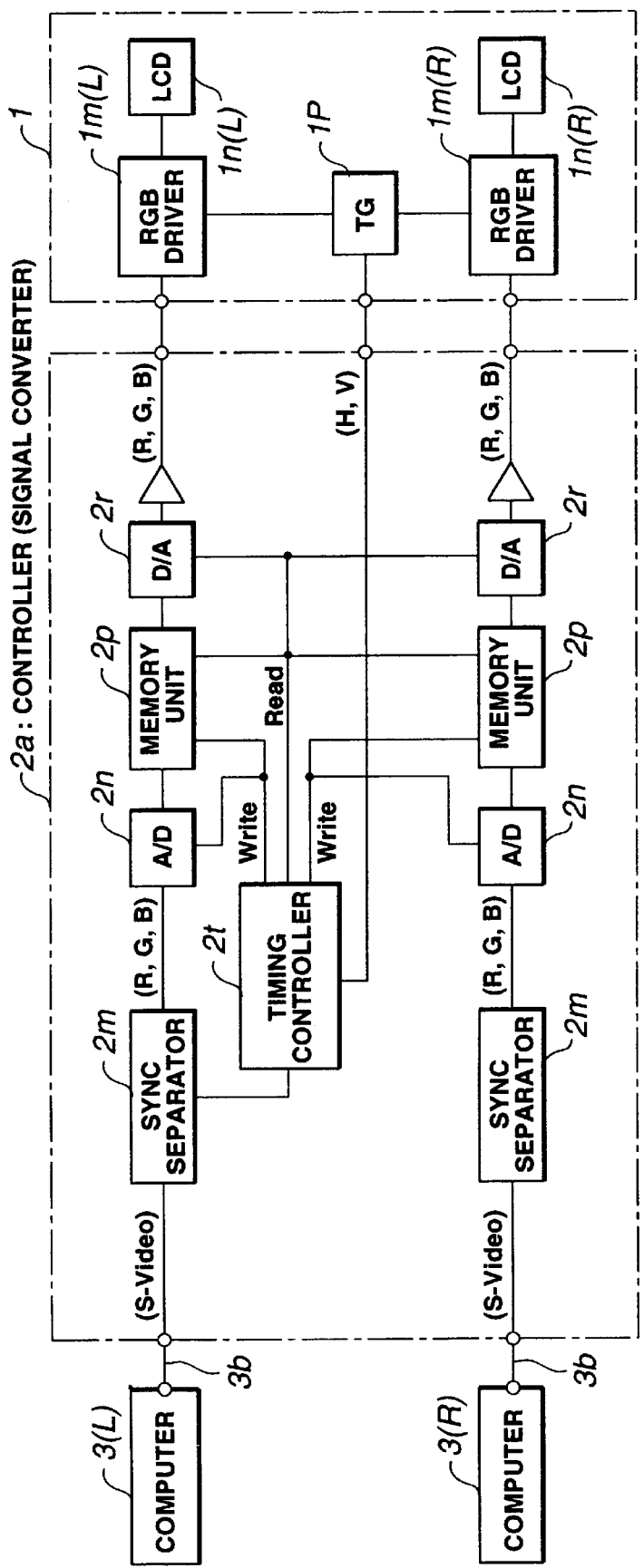
FIG. 7 is a block diagram showing a modified example of the signal converter in the controller which is used for the image observation apparatus shown in FIG. 1.

Here, FIG. 7 is a block diagram showing a modified example of the signal converter in the controller which is used for the above-mentioned first embodiment of the image observation apparatus. As shown in FIG. 7, this modified example has the construction fundamentally similar to that of the signal converter of the controller 2 described above in FIG. 6. Therefore, the same reference codes will be assigned to the similar members and their description will be omitted.

In this modified example, the video signals (S-Video signals are exemplified in FIG. 7) for left and right eyes, which are inputted from the computer 3 (L and R) to the controller 2a, are inputted to the sync separator 2m in the signal converters respectively. In this sync separator 2m, at least either the video signal for a left eye or the video signal for a right eye (the video signal for a left eye is exemplified in FIG. 7) is separated into RGB signals and a sync signal. The RGB signals among these separated signals are converted from analog signals to digital signals by the A/D converter 2n, and thereafter they are stored in the memory unit 2p including field memory and constructing a part of the circuits for left eye. On the other hand, the sync signal is stored in the memory unit 2p, constructing both circuits for left and right eyes, via the timing controller 2t.

In addition, the other video signal (the video signal for a right eye is exemplified in FIG. 7) is outputted to the A/D converter 2n via the sync separator 2m. After the video signal is converted from an analog signal to a digital signal by this A/D converter 2n, the video signal is stored in the memory unit 2p, constructing a part of circuits for a right eye.

Then, the sync signal in the timing controller 2t is supplied to the TG (timing generator) 1p in the head-mounted image display unit 1, which is connected with connecting means such as a flexible printing circuit board, as an H (horizontal clock) signal and a V (vertical clock) signal.

Next, RGB signals stored in both memory units 2p for left and right eyes are read respectively with the sync signal in the timing controller 2t, and they are outputted to the D/A converters 2r for left and right eyes respectively. Then, after each RGB signal is converted from a digital signal to an analog signal by this D/A converter 2r, each RGB signal is outputted to the RGB driver 1m (L and R) of the LCD driver (not shown in FIG. 7; refer to FIG. 6) in the head-mounted image display unit 1, which is connected with a flexible printing circuit board and the like.

On the other hand, the sync signal is outputted from the TG 1p to each RGB driver 1m (L and R) of the LCD driver, and each RGB driver 1m (L and R) outputs the RGB signal to each of the image display units (LCD) for left and right eyes, 1n with securing synchronization. Owing to this, it becomes possible to display images as 3D ones.

In addition, if the above-mentioned modified example of the signal converter is adopted, video signals for left and right eyes, which are inputted to the controller 2a by the computer 3 (L and R), must be synchronized with each other by the field.

Figure 8:
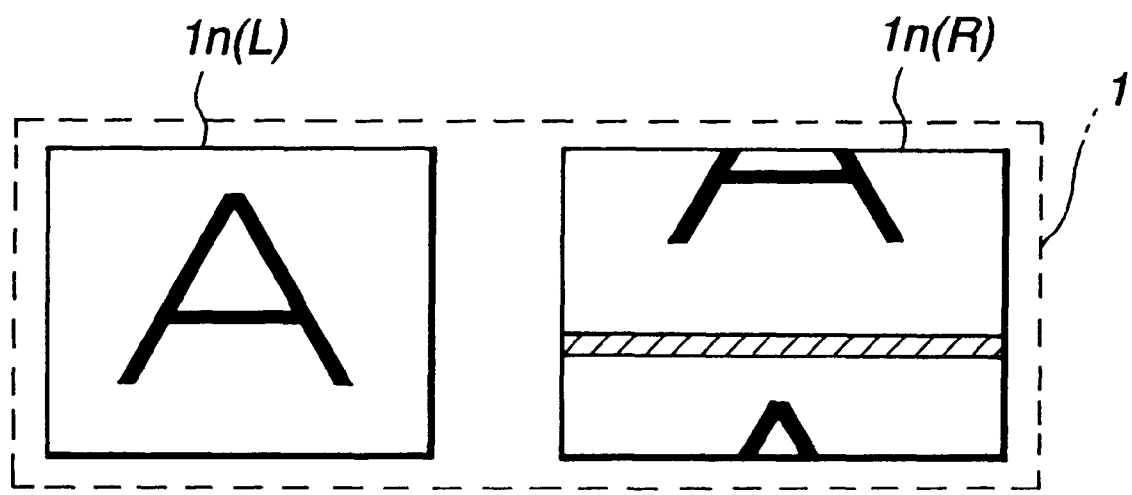
FIG. 8 is a drawing exemplifying display images in the case that video signals displayed respectively on an image display unit for a left eye and an image display unit for a right eye are not synchronized by the field.

Thus, if they are not synchronized by the field, video signals displayed respectively on the image display unit for a left eye, 1n(L) and the image display unit for a right eye, 1n(R) of the head-mounted image display unit 1 are not synchronized with each other. Therefore, as shown in FIG. 8, the image displayed for a left eye (the image displayed on the LCD 1n(L)) and the image displayed for a right eye (the image displayed on the LCD 1n(R)) are shifted in time. Owing to this, these images can not be fused, and hence, 3D images can not be recognized.

As described above, according to the structure of the above-mentioned modified example, it is possible not only to obtain the effect similar to that of the above-mentioned first embodiment, but also to facilitate constructing the controller 2a in lower cost.

In addition, since this example has the timing generator in the head-mounted image display unit 1, images are displayed on the image display units with securing synchronization of the video signals for left and right eyes. Therefore, fine display images can be observed.

Next, a second embodiment of the present invention will be described below.

Figure 9:
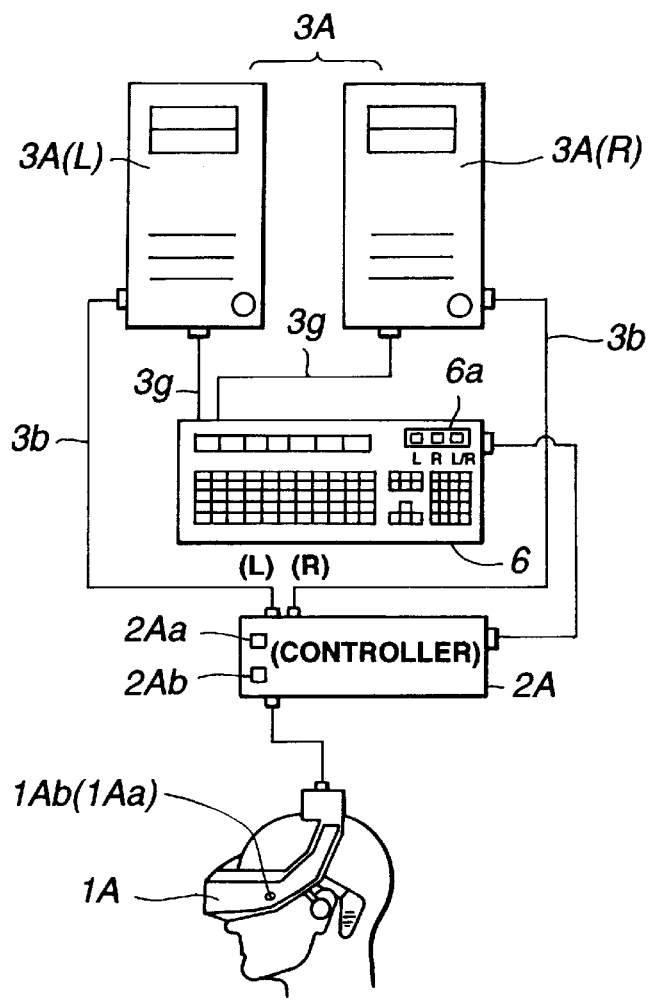
FIG. 9 is a schematic diagram showing the structure of a second embodiment of the image observation apparatus according to the present invention.

FIG. 9 is a schematic diagram showing the second embodiment of the image observation apparatus. Similarly to the above-mentioned first embodiment of the image observation apparatus, this second embodiment of the image observation apparatus is an example of producing 3D images and confirming the 3D images created during this production work, using this image observation apparatus.

Thus, this image observation apparatus comprises: a head-mounted image display unit 1A that is made to display images, derived from video signals supplied to itself, respectively on image display units corresponding to observer's eyes; a computer 3 (L and R) having specifications suitable to the production of images displayed on the head-mounted image display unit 1A, and including an output part for outputting video signals expressing the respective images; and a controller 2A being inserted in a signal transmission line between the computer 3A and the head-mounted image display unit 1A and performing operator's optional operation regarding supply aspects of the video signals from the computer 3A to the head-mounted image display unit 1A.

The above-mentioned computer 3A comprises: two computer mainframes, that is, a computer mainframe 3A(L) comprising controllers including a CPU and mainly processing a video signal for a left eye, and another computer mainframe 3A(R) similarly comprising controllers including a CPU and mainly processing a video signal for a right eye, both video signals being included in video signals forming the 3D images; and a key board 6 that is command input means for inputting a command and the like to the controllers of the computer mainframes 3A (L and R) by an operator's optional operation.

The above-mentioned keyboard 6 is electrically connected to not only the above-mentioned two computer mainframes 3A(L and R) with cables 3g respectively, but also the controller 2A (details will be described later; refer to FIG. 10). A change-over switch 6a is provided in the keyboard 6, the switch being interlocked with a display change-over switch 2Aa (refer to FIG. 10, too) that is a first switch of the controller 2A.

In short, although each computer mainframe 3d has an independent keyboard 3f in the above-mentioned first embodiment; two above-mentioned computer mainframes 3A (L and R) can be operated with a keyboard by selectively switching the computer mainframes 3A (L and R), in the second embodiment.

In addition, video signals (for example, S-Video signals, VGA signals, etc.) are outputted from the output part of the computer 3A (L and R) to the controller 2A via cables 3b whose terminals are connected to the output part respectively.

In addition, similarly to the above-mentioned first embodiment, the computer 3A (L and R) has built-in software for various types of image processing such as modeling software, software for image edition, and rendering software. Furthermore, large size of memory (not shown) is securely kept so as to perform these types of image processing, that is, various types of calculation and data processing regarding image information.

Furthermore, other specifications of the computer 3A (L and R) are similar to those of the computer 3 (L and R) in the first embodiment, and hence, detailed description of them will be omitted.

On the other hand, the controller 2A connects to not only two above-mentioned computers 3A (L and R) and the keyboard 6, but also the head-mounted image display unit 1A.

This head-mounted image display unit 1A is fundamentally the same as that of the first embodiment. However, near both temple parts of the body in the second embodiment of the head-mounted image display unit 1A, as shown in FIG. 9, change-over switches 1Aa and 1Ab are provided. They have functions similar to those of the display change-over switch 2Aa that is a first switch of the controller 2A and an outside-world-image change-over switch 2Ab that is a second switch (these will be described later in detail; refer to FIG. 10). Owing to them, it becomes possible to switch display aspects of images to be displayed on the image display units of the head-mounted image display unit 1A, and to switch display aspects of videos and an outside-world image.

In addition, this second embodiment has not a display that is display means in the above-mentioned first embodiment and is used as a display unit for works. Alternatively, only the head-mounted image display unit 1A serves both as the display unit for works and a display unit (monitor) for confirming a 3D image produced.

Figure 10:
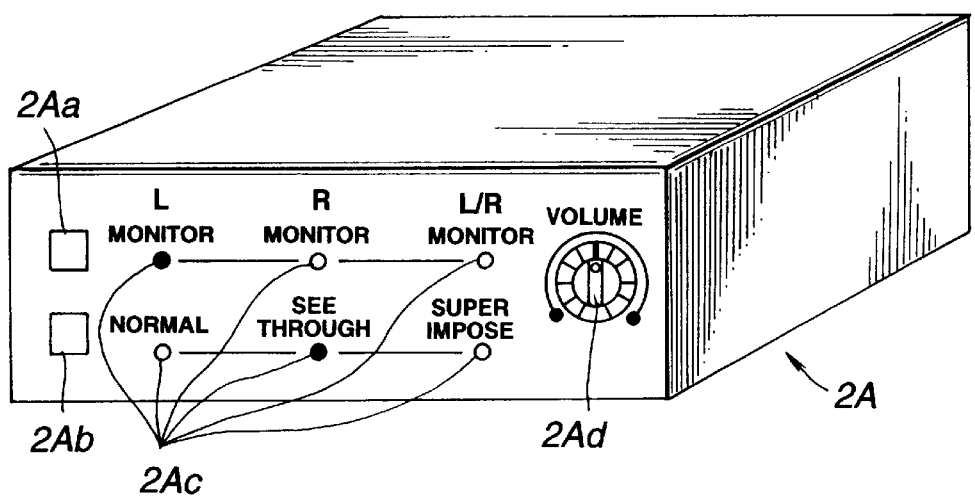
FIG. 10 is a schematic perspective view showing appearance of a controller used for the image observation apparatus shown in FIG. 9.

FIG. 10 is a schematic perspective view showing appearance of the controller used for the second embodiment of the image observation apparatus, and is a drawing when viewed from a front operation panel.

As shown in FIG. 10, the display change-over switch 2Aa and the outside-world-image change-over switch 2Ab are provided on one edge of the front operation panel of the controller 2A. Here, the switch 2Aa is an operation part of a switching circuit for switching display aspects of images to be displayed on the image display units of the head-mounted image display unit 1A. Further, the switch 2Ab switches the see-through function of the head-mounted image display unit 1A and the like.

In addition, a volume control dial 2Ad is provided on the other edge of the operation panel of the controller 2A. The control dial 2Ad controls the sound volume of an audio signal that is outputted from the output part of the above-mentioned computer 3A (L and R), inputted to the controller 2A, and outputted to a speaker (refer to FIG. 2; reference code is 1f) of the head-mounted image display unit 1A.

Furthermore, a status display unit 2Ac is provided on the operation panel of the controller 2A where the display unit 2Ac is located between the above-mentioned display change-over switch 2Aa and outside-world-image change-over switch 2Ab, and the above-mentioned volume control dial 2Ad. Here, the status display unit 2Ac interlocks with the switching operation of the above-mentioned display change-over switch 2Aa and outside-world-image change-over switch 2Ab, displays the status of each switch, and includes, for example, LEDs (light-emitting diodes).

Still more, the above-mentioned display change-over switch 2Aa, as described above, is a switch for switching the display aspects of images to be displayed on the image display units of the head-mounted image display unit 1A. The switch 2Aa can switch the display aspects sequentially, for example, as follows:

1) L MONITOR: A first display aspect of displaying a video signal for a left eye, supplied from the computer 3A(L), on the image display units (LCDs) corresponding to left and right eyes respectively.
2) R MONITOR: A second display aspect of displaying a video signal for a right eye, supplied from the computer 3A(R), on the image display units (LCDs) corresponding to left and right eyes respectively.
3) L/R MONITOR: A third display aspect of displaying both video signals for left and right eyes, supplied from the computer 3A (L and R), on the image display units (LCDs) corresponding to left and right eyes respectively.

In addition, the LED of the status display unit 2Ac, which corresponds to this selected aspect, is lit as interlocking with this switching.

Furthermore, following Table 1 shows the relation between the above-mentioned display change-over switch 2Aa and respective display aspects, that is, the above-mentioned first, second, and third aspects when images are displayed on the image display units for left and right eyes.

TABLE 1

| 1st SW LCD | L | R | |
|---|---|---|---|
| L MONITOR | Image L | Image L | ┐ |
| R MONITOR | Image R | Image R | ┘ 2D |
| L/R MONITOR | Image L | Image R | — 3D |

In addition, "2D" shown in this Table 1 means that an image displayed in first and second display aspects is plane, that is, two-dimensional. Further, "3D" means that an image displayed in a third display aspect is three-dimensional.

On the other hand, the outside-world change-over switch 2A*b* is a switch for switching the see-through function and the like of the head-mounted image display unit 1A. Therefore, this switch 2A*b*, similarly to the above-mentioned display change-over switch 2A*a*, can switch the operation modes sequentially, for example, as follows:

1) NORMAL: A first operation mode for observing an image derived from video signals supplied to the head-mounted image display unit 1A with view of the outside world being cut out.
2) SEE THROUGH: A second operation mode in which the see-through mode becomes available, wherein only the view of the outside world is secured.
3) SUPER IMPOSE: A third operation mode in which the super impose mode becomes available, wherein it becomes possible to see an image derived from video signals supplied to the head-mounted image display unit 1A with the view of the outside world being overlapped.

In addition, the LED of the status display unit 2A*c*, which corresponds to this selected mode, is lit as interlocking with this switching.

In addition, the example shown in FIG. 10 represents the status that the display change-over switch 2A*a* is set to "L MONITOR", and the outside-world change-over switch 2A*b* is to "SEE THROUGH".

Furthermore, a sync circuit is incorporated in the controller 2A, and hence, owing to this, video signals for a left eye and for a right eye, which are supplied from two computers 3A(L and R), are synchronized with each other. This sync circuit will be simply described below with reference to the block diagram shown in FIG. 11.

Figure 11:
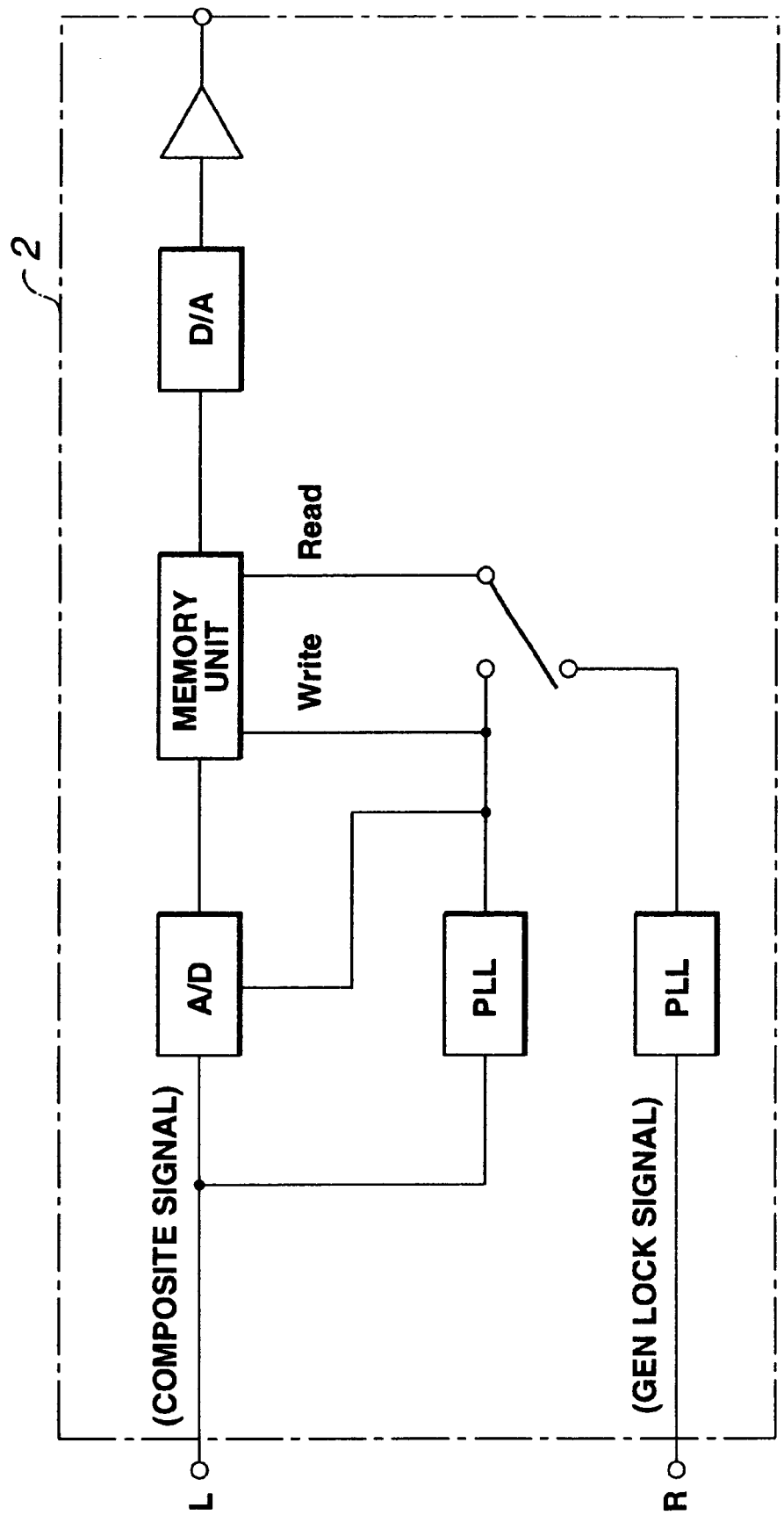
FIG. 11 is a block diagram showing a sync circuit located in the controller used for the image observation apparatus shown in FIG. 9.

As shown in FIG. 11, a signal relating to an image (image signal) in a video signal for a left eye (a composite signal is exemplified in FIG. 11) is inputted to the A/D converter. After converted from an analog signal to a digital signal, the image signal is stored in a memory unit constructing a part of circuits for a left eye. At the same time, a sync signal in the video signal for a left eye is stored in the memory unit through a PLL(phase-locked loop).

On the other hand, a sync signal for reading can switch Gen Lock signals for a left eye and for a right eye. Owing to this, it becomes possible to secure synchronization of a video signal for a right eye by using the video signal for a left eye as a reference signal. Thus, a Gen Lock circuit is constructed.

Figure 12:
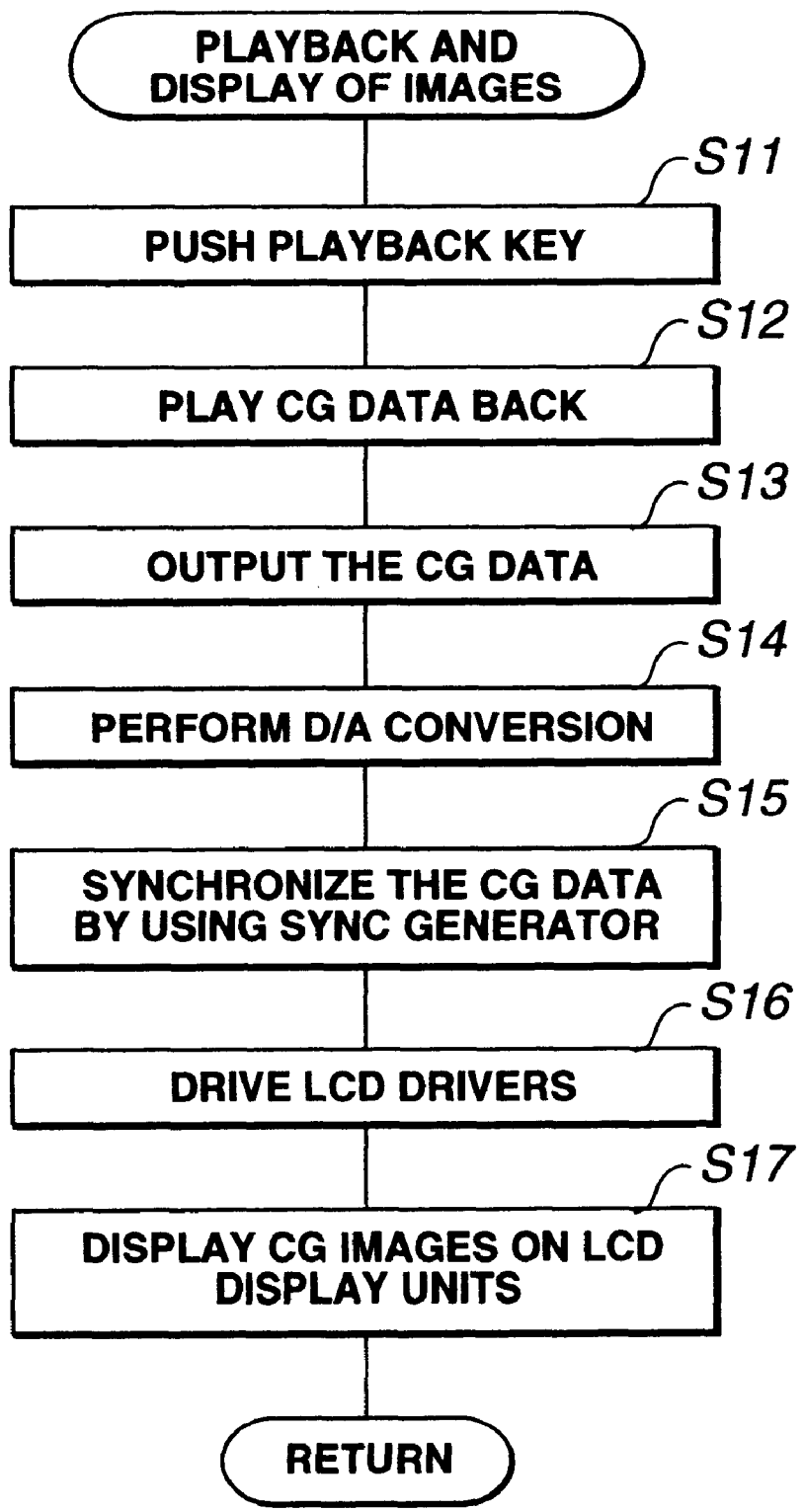
FIG. 12 is a flow chart showing a sequence for playback and display of images which is applied when a production work of 3D images is performed by the image observation apparatus shown in FIG. 9.
Figure 13:
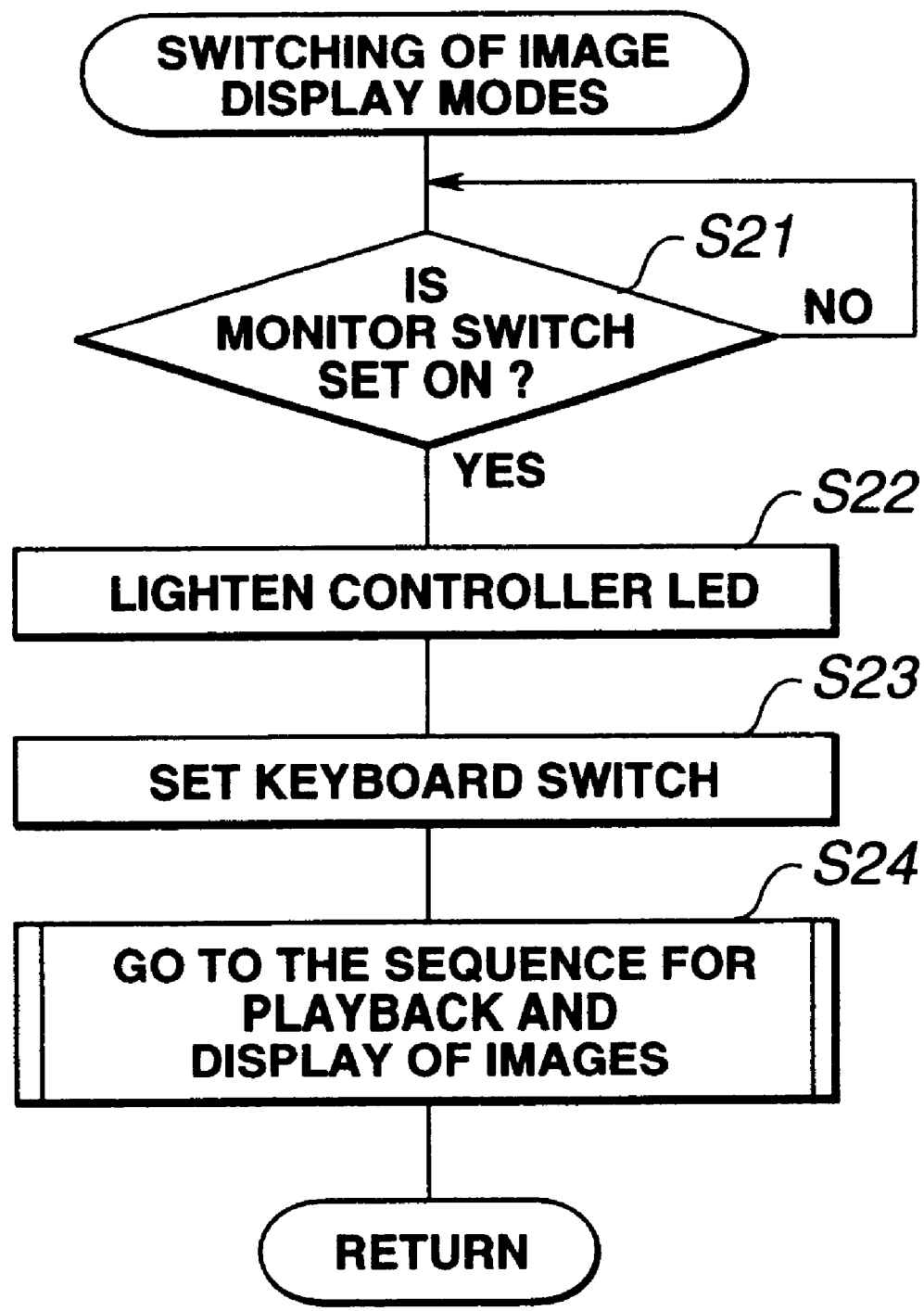
FIG. 13 is a flow chart showing a sequence for switching of image display modes which is applied when a production work of 3D images is performed by the image observation apparatus shown in FIG. 9.

Here, it will be simply described below with reference to flow charts shown in FIGS. 12 and 13 how to perform image playback for confirming a produced 3D image during a production work of the 3D image. In addition, it is exemplified how to render a video signal for a left eye with the computer 3A(L).

First, a sequence for switching image display modes will be described below with reference to FIG. 13. As shown in FIG. 13, it is confirmed at step S21 whether the display change-over switch 2A*a* of the controller 2A was operated (is its status on?). Thus, by an operator operating the display change-over switch 2A*a*, a display mode of images to be displayed on the image display units of the head-mounted image display unit 1A is selected. In consequence, if the display change-over switch 2A*a* is on, and hence, it is determined that a display mode is selected, the process goes to the next step S22.

At step S22, the controller 2A makes an LED, which corresponds to the selected display mode, light. Here, since rendering the video signal for a left eye is exemplified, the LED of the status display unit 2A*c*, which corresponds to "L MONITOR", is lit by the operator pushing the display change-over switch 2A*a* of the controller 2A. Owing to this, the image derived from the video signal for a left eye can be displayed on both image display units (LCDs) for a left eye and for a right eye that are included the head-mounted image display unit 1A. Then, the process goes to the next step S23.

At step S23, interlocking with operation of the display change-over switch 2A*a* of the controller 2A at the above-mentioned step S22, the change-over switch 6*a* of the keyboard 6 is switched so as to correspond to the display mode selected at the above-mentioned step S21. Here, the change-over switch 6*a* of the keyboard 6 becomes available as a keyboard for the computer 3A(L). Then, the process goes to the next step S24, where a sequence for playback and display of images that is shown in FIG. 12 is executed.

Next, when the process moves to the sequence for playback and display of images (FIG. 12), the operator inputs a playback command to the computer 3A(L) through the keyboard 6 at step S11 for playing image data derived from the video signal, for example, CG picture data back. Then, the process goes to the next step S12.

Subsequently, at step S12, playback operation of the image data for a left eye, derived from the desired video signal, is started, and the process goes to the next step S13. At this step S13, the image data for a left eye is outputted. At the next step S14, the image data for a left eye is converted from a digital signal to an analog signal by the D/A converter in the computer 3A(L). The image data is thereafter outputted from the output part of the computer 3A(L) to the controller 2A, and the process goes to the next step S15.

At step S15, the image data for a left eye, inputted from the output part of the computer 3A(L) to the controller 2A at step S14, is securely synchronized by the sync generator in this controller 2A. Thereafter, the image data is outputted to the head-mounted image display unit 1A, and the process goes to the next step S16.

The LCD drivers for driving the image display units of the head-mounted image display unit 1A are driven at step S16, and the process moves to the next step S17. At this step S17, the LCD drivers make both image display units (LCDS) for a left eye and for a right eye display the image, derived from the video signal for a left eye, simultaneously, and a series of steps is completed (RETURN).

In addition, the source of the images displayed on the image display units (LCDs) for a left eye and for a right eye that are included in the head-mounted image display unit 1A is the video signal for a left eye. However, since the images are securely synchronized by the sync generator in the controller 2A at the above-mentioned step S15, flicker of screens and the like does not make observation of the images difficult. Therefore, an observer observes plane images (two-dimensional images) with left and right eyes.

As described above, according to the second embodiment, only the head-mounted image display unit 1A is used as display means for the computers 3A(L and R). Therefore, not only the display means can be simplified and minimized, but also image production works and confirmation of the produced images can be easily performed.

In addition, it becomes possible to easily select a display mode of video signals displayed on the image display units of the head-mounted image display unit 1A by switching the display change-over switch 2Aa of the controller 2A. Hence, it is possible to observe each of display aspects by optionally switching them with wearing the head-mounted image display unit 1A. Therefore, this embodiment can contribute to increase of work efficiency.

Further, although it is not described here in details, it is needless to say that it is possible not only to optionally observe the images, but also to produce and revise the object data with observing each of monitors used in computer mainframes 3A (L and R).

Furthermore, the change-over switch 6a of the keyboard 6 is simultaneously switched with interlocking with the switching operation of the display change-over switch 2Aa, and hence, the display mode of the head-mounted image display unit 1A corresponds to the status of the keyboard 6. Therefore, it is possible to prevent misoperation such as mistake of the keyboard, which arises in case of using two keyboards.

Still more, since the single keyboard 6 is used by two computer mainframes 3A(L and R) through optionally switching them, the keyboard 6 as command input means is commonly used between two computer mainframes 3A(L and R). Therefore, this embodiment can contribute to simplification of the entire apparatus's construction and reduction of manufacturing cost.

In addition, similarly to the first embodiment, each dedicated keyboard can be provided for each computer mainframe. In this case, it becomes necessary not only to network-link two computer mainframes 3A(L and R), but also to provide a keyboard to each computer mainframe. However, it is not necessary to provide for each keyboard the change-over switch 6a interlocking with the operation of the display change-over switch 2Aa of the controller 2A. Therefore, it becomes possible to omit a circuit for interlocking with the controller 2A and an electric circuit for status display of the keyboard 6 itself.

Next, the third embodiment of the present invention will be described below.

Figure 14:
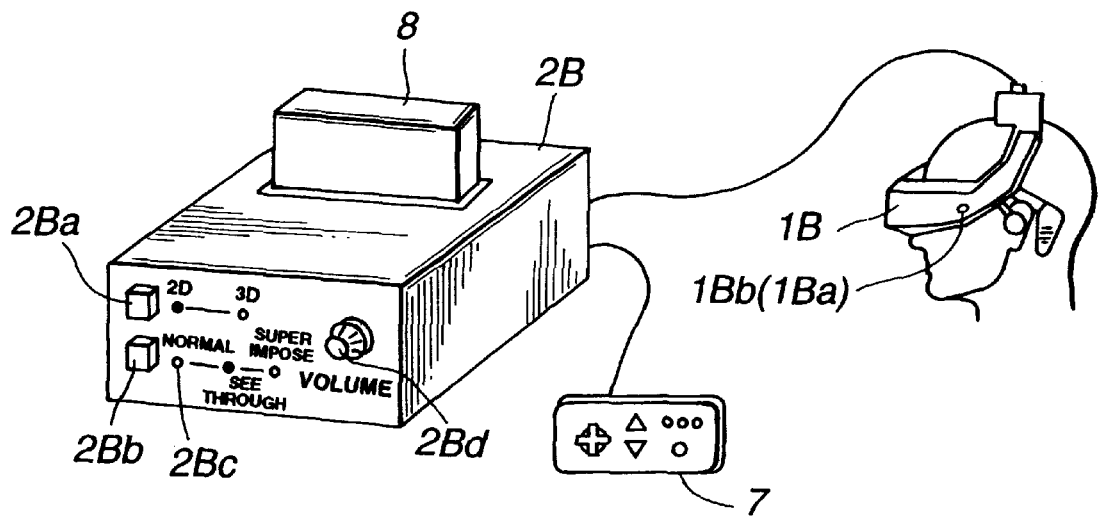
FIG. 14 is a schematic diagram showing the structure of a third embodiment of the image observation apparatus according to the present invention.
Figure 15:
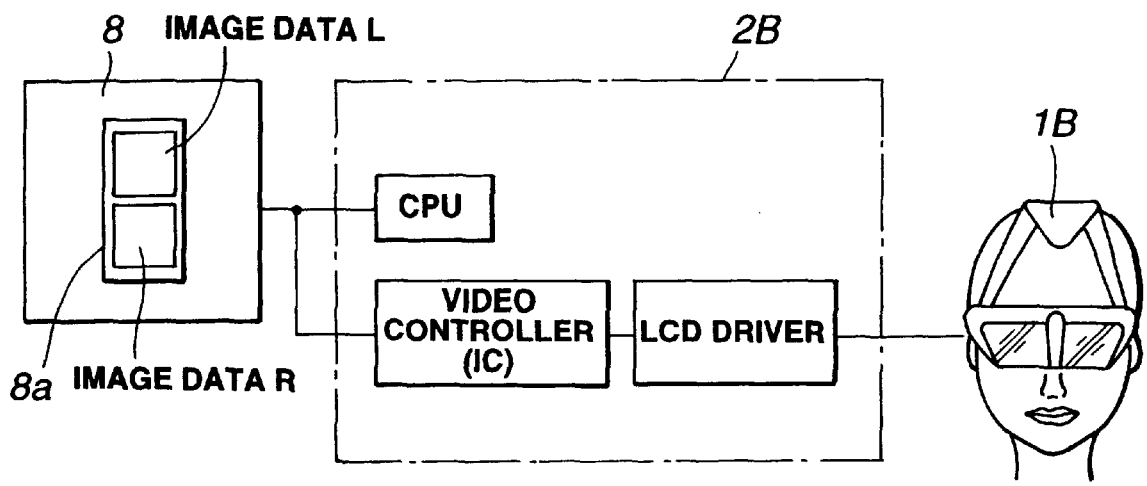
FIG. 15 is a block diagram simply showing the structure of the image observation apparatus shown in FIG. 14.

FIGS. 14 and 15 are drawings showing the outline of this third embodiment of the image observation apparatus, FIG. 14 is a schematic diagram showing this image observation apparatus, and FIG. 15 is a block diagram simply showing this image observation apparatus. In addition, this third embodiment of the image observation apparatus is an example of using this apparatus for playing a game and the like.

As shown in FIG. 14, this image observation apparatus comprises: a head-mounted image display unit 1B for displaying images, derived from video signals supplied to itself, on image display units corresponding to a left eye and a right eye of an observer respectively; and a controller 2B, into which a game card 8 being a memory medium where image data having a parallax are stored can be selectively inserted, and which supplies video signals, corresponding to the operated image data, to the head-mounted image display unit 1B by an operator operating image data with a control pad 7 that is operation means for the operator optionally operating image data read from the inserted game card 8.

The controller 2B has construction fundamentally similar to the controller 2A used in the second embodiment of the image observation apparatus. Thus, as shown in FIG. 14, the display change-over switch 2Ba and the outside-world-image change-over switch 2Bb are provided on one edge of the front operation panel of the controller 2B. Here, the switch 2Ba is an operation part of a switching circuit for switching display aspects of images to be displayed on the image display units of the head-mounted image display unit 1B. Further, the switch 2Bb switches the see-through function of the head-mounted image display unit 1B and the like.

In addition, a volume control dial 2Bd is provided on the other edge of the operation panel of the controller 2B. The control dial 2Bd controls the sound volume of audio signals that are stored in a game card 8 and outputted from the speakers (refer to FIG. 2 reference code is 1f) of the head-mounted image display unit 1A.

Furthermore, a status display unit 2Bc is provided between the above-mentioned display change-over switch 2Ba and outside-world-image change-over switch 2Bb, and the above-mentioned volume control dial 2Bd which are located on the operation panel of the controller 2B. Here, the status display unit 2Bc interlocks with the switching operation of the above-mentioned display change-over switch 2Ba and outside-world-image change-over switch 2Bb, displays the status of each switch, and includes, for example, LEDs (light-emitting diodes).

Still more, the above-mentioned display change-over switch 2Ba, as described above, is a switch for switching the display aspects of images to be displayed on the image display units of the head-mounted image display unit 1A. The switch 2Ba can switch at least two display aspects sequentially, for example, as follows:

1) 2D: A display aspect of displaying two-dimensional video signals, supplied by a game card 8, on the image display units (LCDs) of the head-mounted image display unit 1B corresponding to left and right eyes respectively.

2) 3D: A display aspect of displaying image data, having a binocular parallax and being supplied by a game card 8, on the image display units (LCDs) of the head-mounted image display unit 1B corresponding to left and right eyes respectively.

In addition, the LED of the status display unit 2Bc on the operation panel of the controller 2B, which corresponds to this selected aspect, is lit as interlocking with this switching.

In addition, the outside-world change-over switch 2Bb is a switch for switching the see-through function and the like of the head-mounted image display unit 1B, and has the same function as that of the above-mentioned display change-over switch 2Ab of the second embodiment.

Further, the example shown in FIG. 14 represents the status that the display change-over switch 2Ba is set to "2D", and the outside-world-image change-over switch 2Bb is to "SEE THROUGH".

On the other hand, the controller 2B has a game card 8, which is a memory medium storing image data having a binocular parallax and is selectively located in the attachable and detachable manner. Further, the controller 2B is connected to the head-mounted image display unit 1B and a control pad 7 for operator's optional operation.

The head-mounted image display unit 1B is approximately similar to that of the above-mentioned second embodiment fundamentally. Thus, change-over switches 1Ba and 1Bb, provided in the vicinity of both temples of the body constructing the third embodiment of the head-mounted image display unit 1B, have functions similar to those of the above-mentioned display change-over switch 2Ba and outside-world-image change-over switch 2Bb of the controller 2B. Owing to this, it becomes possible to switch the display aspects of images to be displayed on the image display units of the head-mounted image display unit 1B, and to switch video images and the outside-world image using the see-through function and the like.

In addition, as shown in FIG. 15, the controller 2B includes: a control circuit (computer) having a CPU and controlling this entire image observation apparatus; a video controller (IC) sequentially reading the image data stored in the game card 8 and converting the image data into video signals; an LCD driver for driving the image display units (LCDs) that are display elements of the head-mounted image display unit 1B, and making the image display units display images derived from the video signals; a speaker controller for controlling volume of the speakers in the head-mounted image display unit 1B; and a power supply (not shown in FIG. 15).

Furthermore, the game card 8 includes memory means 8a composed of ROMs and the like. This memory means 8a successively stores image data having a binocular parallax, that is, image data L composed of a video signal for an left eye and image data R composed of a video signal for an right eye, respectively.

Still more, if a display aspect is set to be the "3D" mode by the display change-over switch 2Ba of the controller 2B or the change-over switch 1Ba, image data for a left eye and for a right eye are alternately read in the field sequential method. Then, the image data are converted to video signals, and thereafter, a 3d image is displayed using the image display units of the head-mounted image display unit 1B.

Figures 16A, 16B:
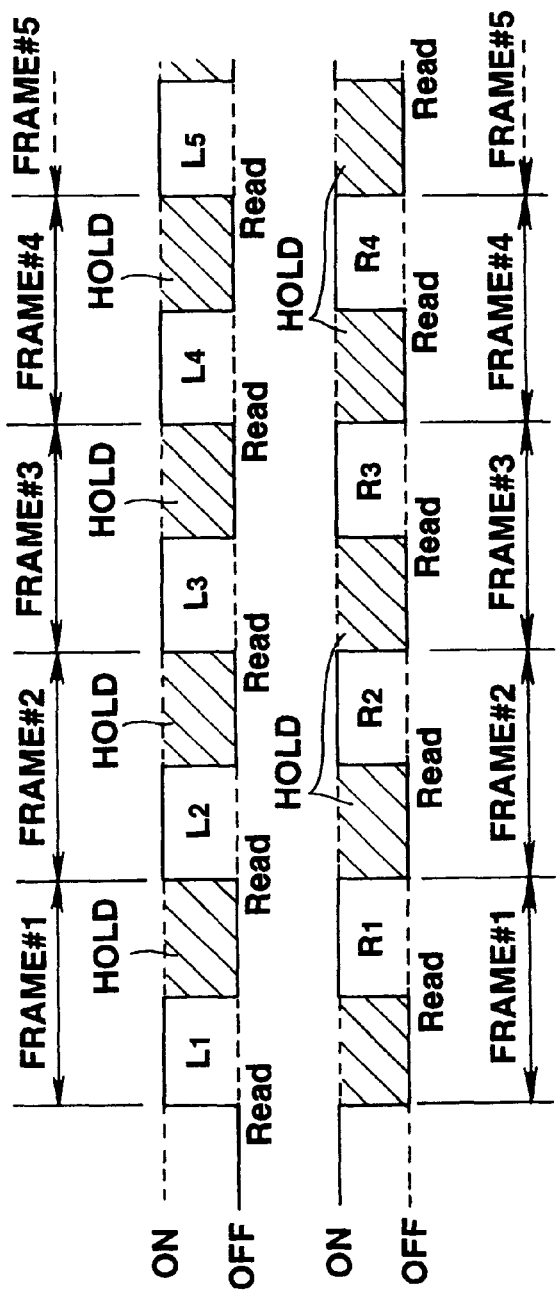
FIG. 16A is a conceptual drawing showing states when a video signal for a left eye is read and displayed in the image observation apparatus shown in FIG. 14.
FIG. 16B is a conceptual drawing showing states when a video signal for a right eye is read and displayed in the image observation apparatus shown in FIG. 14.

Thus, as shown in FIGS. 16A and 16B, first, a video signal for a left eye, L1 (one field; odd field; refer to FIG. 16A) is read from the memory means 8a (refer to FIG. 15) of the game card 8 by the video controller, outputted to and displayed on the image display unit for a left eye. After that, a video signal for a right eye, R1 (one field; even field;refer to FIG. 16B) corresponding to this video signal for a left eye, L1 is read, outputted to and displayed on the image display unit for a right eye.

Owing to this, between video signals of frame #1, the video signal for a left eye, L1 is displayed on the image display unit for a left eye, the video signal for a right eye R1 is on the image display unit for a right eye, and in consequence, display of one frame is formed. In addition, in this case, the video signal for a left eye, L1 is continuously displayed owing to the memory effect of the LCD while the video signal for a right eye, R1 is read and displayed. Further, the video signal for a right eye, R1 between video signals of frame #1, is continuously displayed while the video signal for a left eye, L2 (one field) in the next frame is read and displayed (refer to the diagonally shaded area in FIGS. 16A and 16B).

Therefore, on the image display units, corresponding to the observer's left and right eyes respectively, video signals respectively corresponding to the observer's eyes are displayed during one frame time (nearly 1/30 sec.), but owing to holding the display during a field, the flicker of the display image is reduced.

After that, subsequent video signals L and R are alternately outputted in the field sequential method to each of image display units corresponding to a left eye and a right eye. Therefore, it becomes possible to observe a 3D image with the head-mounted image display unit 1B.

As described above, according to the above-mentioned third embodiment, with inserting into the controller 2B a game card 8 storing image data having the binocular parallax, it becomes easy to switch display modes by switching the display modes to the "3D" mode with the display change-over switch 2Ba of the head-mounted image display unit 1B or the change-over switch 1Ba. Further, it is also possible to enjoy games, having 3D images, with a simpler apparatus.

In addition, since the head-mounted image display unit 1B is adopted as image display means, it becomes possible not only to miniaturize the entire apparatus, but also to let the head-mounted image display unit 1B be in the status of cutting off the outside-world image (the first operation mode) by optionally operating a change-over switch of the controller 2B or head-mounted image display unit 1B, that is, the outside-world-image change-over switch 2Bb or 1Bb. Therefore, it becomes possible to enjoy games having much verve and presence.

Furthermore, it is possible to easily enjoy various types of desired games by selectively inserting and/or detaching various types of game cards 8 storing image data having different contents to the controller 2B.

Still more, it is possible to display images supplied from computers in the field sequential method by using an apparatus having construction similar to that of the head-mounted image display unit 1B. In this case, a CRT controller is used.

Next, the fourth embodiment of the present invention will be described below.

Figure 17:
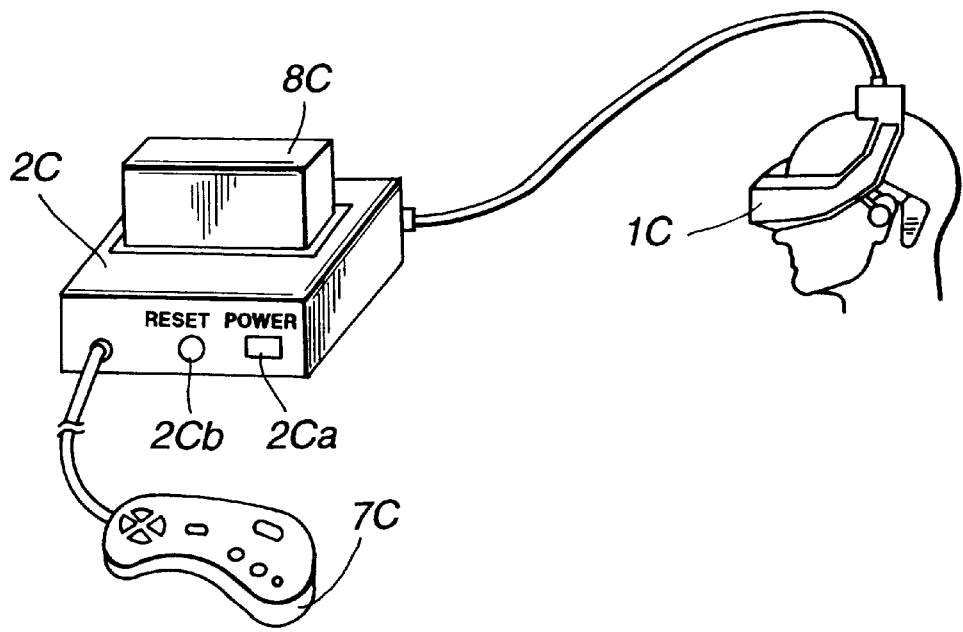
FIG. 17 is a schematic drawing showing the structure of a fourth embodiment of the image observation apparatus according to the present invention.
Figure 18:
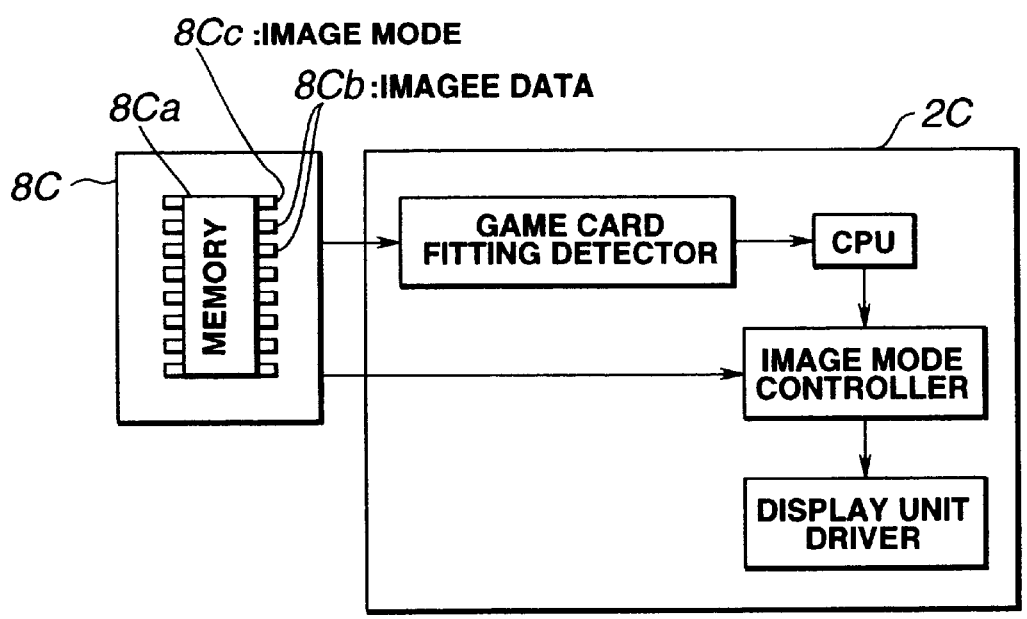
FIG. 18 is a block diagram simply showing the structure of the image observation apparatus shown in FIG. 17.

FIGS. 17 and 18 are drawings showing the outline of this fourth embodiment of the image observation apparatus, FIG. 17 is a conceptual diagram showing this image observation apparatus, and FIG. 18 is a block diagram simply showing this image observation apparatus. In addition, this fourth embodiment of the image observation apparatus is an example of using this apparatus for playing a game and the like, and also, an example of an image observation apparatus capable of changing an aspect ratio of its screen.

As shown in FIG. 17, this image observation apparatus comprises: a head-mounted image display unit 1C for displaying images, derived from video signals supplied to itself, on image display units corresponding to a left eye and a right eye of an observer respectively; and a controller 2C, into which a game card 8C being a memory medium storing image data and supplementary information to define a display aspect of the image (picture mode) are stored can be selectively inserted, and which supplies video signals, corresponding to the operated image data, to the head-mounted image display unit 1C by an operator operating image data with a control pad 7 that is operation means for the operator optionally operating image data read from the inserted game card 8C.

A game card 8C is selectively located in the controller 2C in the attachable and detachable manner, and further, connects to the head-mounted image display unit 1C and the control pad 7. In addition, in this fourth embodiment, the above-mentioned control pad 7 is the same as that in the above-mentioned third embodiment.

A main power switch (POWER SW) 2Ca switching the main power supply to ON or OFF and a reset switch (RESET SW) 2Cb capable of initializing a game card 8C inserted into the controller 2C are located on the front operation panel of the controller 2C.

In addition, as shown in FIG. 18, the controller 2C includes: a control circuit having a CPU and controlling this entire image observation apparatus; a game card insertion detecting circuit for detecting the insertion status of a game card 8C; an picture mode control circuit for reading from the inserted game card 8C the supplemental information defining the display aspect (picture mode) of the image and the like, controlling display aspects (picture modes) in the image display units of the head-mounted image display unit 1C with depending on this supplemental information; and display unit drivers, being controlled by this picture mode control circuit, for driving the display units of the head-mounted image display unit 1C, and switching arrangements of display units.

Furthermore, a game card 8C has memory means 8Ca including memory such as ROM, the memory means 8Ca, as described above, storing the supplemental information 8Cc defining the display aspect of the image and image data 8Cb for forming the image.

Further, a concrete example of the above-mentioned supplemental information 8Cc is, for example, the information expressing an aspect ratio of the display screen where an observer can observe the image data in a game card 8C in optimum conditions.

The head-mounted image display unit 1C is fundamentally similar to that of the above-mentioned first embodiment. However, the construction of display units constructing the image display units of the head-mounted image display unit 1C in this fourth embodiment is different from that in the first embodiment.

Figure 19:
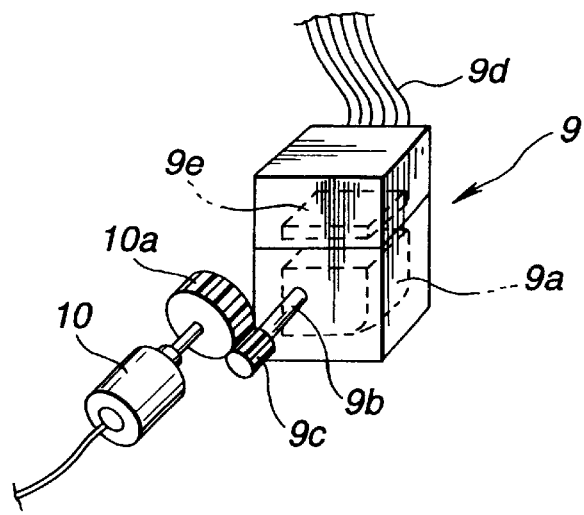
FIG. 19 is a partially enlarged perspective view showing only one side of display units constructing an image display unit of a head-mounted image display unit used in the image observation apparatus shown in FIG. 17.

Thus, FIG. 19 is a partially enlarged perspective view showing only one unit of display units constructing image display units of the head-mounted image display unit used in the fourth embodiment of the image observation apparatus, the display units being composed of a unit for a left eye and another unit for a right eye that correspond to observer's left and right eyes respectively. Here, although only one unit of the display units constructing the image display unit for left and right eyes is shown, and another unit is omitted, the image display unit of the head-mounted image display unit 1C is composed of a pair of the similar component units.

As shown in FIG. 19, the display unit 9 includes a liquid-crystal display panel (LCD) and back lights. Hence, the display unit 9 comprises: an image display unit 9e for displaying an image derived from a video signal; and an optical system 9a for guiding a light beam, forming the image displayed by this image display unit 9e, as the image to observer's eyes. In addition, the image display unit 9e and optical system 9a are formed in one piece. Further, a flexible printed circuit board 9d is connected to the above-mentioned image display unit 9e, and a video signal is supplied from the controller 2C to the image display unit 9e via this flexible printed circuit board 9d.

Furthermore, the display unit 9 has a display unit rotation shaft 9b for rotating the entire display unit 9, and this rotation shaft has a fixed pinion gear 9c. This pinion gear 9c meshes with a reduction gear 10a, and this reduction gear 10a is fixed to the rotating shaft of a motor 10 that is driving means and is capable of normal and reverse rotation.

Therefore, rotary driving power of the motor 10 is transferred to the display unit rotation shaft 9b through the reduction gear 10a and pinion gear 9c, and hence, the display unit 9 is rotated.

In addition, the above-mentioned head-mounted image display unit 1C in this fourth embodiment differing from those in the first, second, and third embodiments, the unit IC has not a change-over switch for an outside-world image regarding the see-through function and the like. Hence, in regard to the outside-world image, a head-mounted image display unit is adopted, the unit having so-called negative types of LC shutters which are normally-closed and common.

Operation of the fourth embodiment of the image observation apparatus constructed in this manner will be simply described below.

First, an optional game card 8C is inserted in the controller 2C whose main power switch 2Ca is turned on. Then, insertion of the game card 8C is detected by the game card insertion detecting circuit in the controller 2C, and this information is transferred to the CPU in the controller 2C.

Then, the CPU in the controller 2C issues the information readout command to the picture mode control circuit. Owing to this, the picture mode control circuit reads the supplemental information 8Cc defining information regarding the picture mode, stored in the memory means 8Ca of the inserted game card 8C, such as the display aspect of the image and the like. In addition, the controller circuit controls the display unit drivers in the basis of the read supplemental information, and switches arrangements of the display units 9.

Thus, the picture mode control circuit reads from the memory means 8Ca of the game card 8C the information expressing the aspect ratio of the screen and the like as the supplemental information 8Cc defining the display aspect and the like of the read image. Further, the control circuit also switches arrangements of the display units 9 on the basis of this supplemental information 8Cc.

Figure 20:
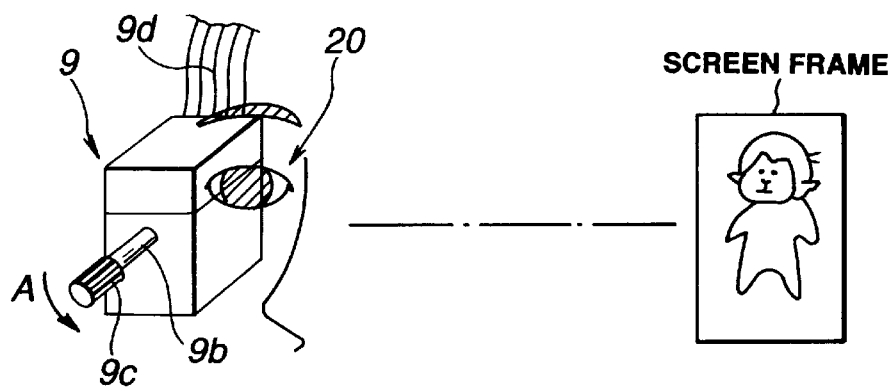
FIG. 20 is a drawing for explaining operation of the display unit of the image display unit constructing the head-mounted image display unit in the image observation apparatus shown in FIG. 17 and for showing the state of displaying a long screen frame.
Figure 21:
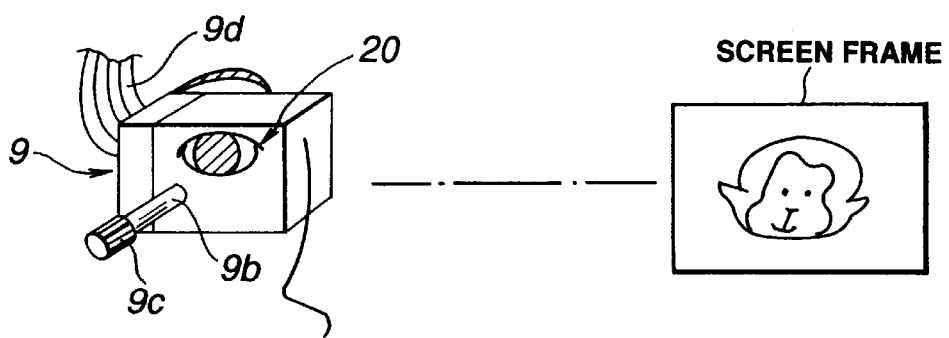
FIG. 21 is a drawing for explaining an operation of the display unit of the image display unit constructing the head-mounted image display unit in the image observation apparatus shown in FIG. 17 and for showing the state of displaying a wide screen frame.

Here, if the information expressing the aspect ratio of the screen, as the supplemental information, is "a wide screen," the picture mode control circuit, as shown in FIG. 20, rotates the motor 10 (not shown in FIG. 20; refer to FIG. 19) by controlling the display unit driver. Further, the control unit also rotates the display unit rotation shaft 9b toward the direction of the arrow A shown in FIG. 20. Owing to this, the display unit 9 rotates toward the same direction entirely, and in consequence, the unit 9 becomes in the status shown in FIG. 21. Hence, observer's eyes 20 can observe the image in a wide screen frame.

In addition, if starting a different type of game (a game by a different game card 8C), an observer remove the inserted game card 8C, which is used this time, from the controller 2C, the observer inserts another game card 8C, which will be used next time, into the controller 2C. Then, by pushing the reset switch 2Cb, the controller 2C is initialized without turning the main power switch 2Ca off. Owing to this, the controller 2C detects again insertion of the game card 8C with the game card insertion detecting circuit. Then, the controller 2C reads the supplemental information regarding the display aspect stored in the memory means 8Ca of the newly inserted game card 8C. Further, the control circuit also performs similar operation on the basis of this read supplemental information.

As described above, according to the fourth embodiment, the memory means 8Ca in the game card 8C stores supplemental information 8Cc (for example, information of the aspect ratio of the display screen) defining the display aspect (picture mode) and the like of the image beforehand. Then, the supplemental information 8Cc regarding this picture mode is read if it is detected that this game card 8C is inserted into the controller 2C. Next, by rotating the display unit constructing the image display unit on the basis of this read supplemental information 8Cc, the aspect ratio of the screen is controlled. Therefore, it becomes possible to observe the image in the optimum status for the image in the inserted game card 8C, that is, an optimum aspect ratio. Hence, it is possible to enjoy the game with better comfortableness and presence.

Further, owing to adopting the head-mounted image display unit 1C as the image display means, miniaturization of the entire apparatus can be achieved.

In addition, although the fourth embodiment performs the control of rotating the entire display unit, the present invention is not limited to this, but it can be conceivable to adopt the construction of that only the image display unit rotates.

Figure 22:
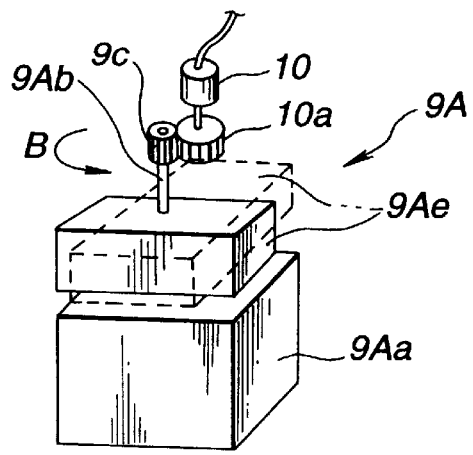
FIG. 22 is a partially enlarged perspective view showing a modified example of the fourth embodiment of the present invention, and showing a display unit constructing an image display unit of a head-mounted image display unit used in the image observation apparatus.

Thus, FIG. 22 is a drawing showing a modified example of the fourth embodiment, and a partially enlarged perspective view simply showing one unit between display units constructing an image display unit for left and right eyes that is a component of a head-mounted image display unit used in the image observation apparatus.

Further, also in FIG. 22, similarly to FIG. 19, the image display unit of the head-mounted image display unit is composed of a pair of the similar component units, and hence, only one unit between display units constructing the image display unit for left and right eyes is shown, and another unit is omitted.

In addition, this modified example of the display unit fundamentally has the construction similar to the display unit 9 of the fourth embodiment (refer to FIG. 19). Therefore, the same reference codes will be assigned to the similar members and their description will be omitted.

As shown in FIG. 22, this modified example of the display unit 9A comprises an LCD panel and back lights. Thus, the display unit 9A comprises: an LCD unit, image display unit 9Ae for displaying an image derived from a video signal; and an optical unit 9Aa for guiding a light beam, forming the image displayed by this image display unit 9Ae, as the image to observer's eyes.

The optical unit 9Aa is fixed in the head-mounted image display unit, and the LCD unit 9Aa is located with freely rotating to the optical unit 9Aa. Thus, the LCD unit 9Ae has an LCD unit rotation shaft 9Ab for rotating this LCD unit 9Ae against the optical unit 9Aa, and this LCD unit rotation shaft 9Ab has a fixed pinion gear 9c. This pinion gear 9c meshes with a reduction gear 10a, and this reduction gear 10a is fixed to the rotating shaft of a motor 10 that is driving means and is capable of normal and reverse rotation.

Therefore, rotary driving power of the motor 10 is transferred to the LCD unit rotation shaft 9Ab through the reduction gear 10a and pinion gear 9c, and hence, the LCD unit 9Ae is rotated.

Figure 23:
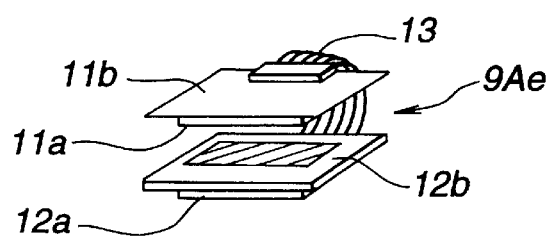
FIG. 23 is a partially enlarged perspective view showing only LCD unit constructing an image display unit used in the image observation apparatus shown in FIG. 22.

FIG. 23 is a partially enlarged perspective view showing only the LCD unit 9Ae constructing this modified example of the display unit 9A.

As shown in FIG. 23, the LCD unit 9Ae comprises: a back light substrate 11b; a back light 11a located on this back light substrate 11b; an LCD panel 12b; an LCD display part 12a located on this LCD panel 12b; and a flexible printed circuit board 13 electrically connecting the back light substrate 11b and LCD panel 12b.

Since the irradiation surface of the back light 11a is located toward the optical unit 9Aa (not shown in FIG. 23; refer to FIG. 22), irradiation light from the back light 11a enters from the back side of the LCD display part 12a. After the irradiation light passes through the LCD display part 12a, it is guided into the optical unit 9Aa.

Figure 24:
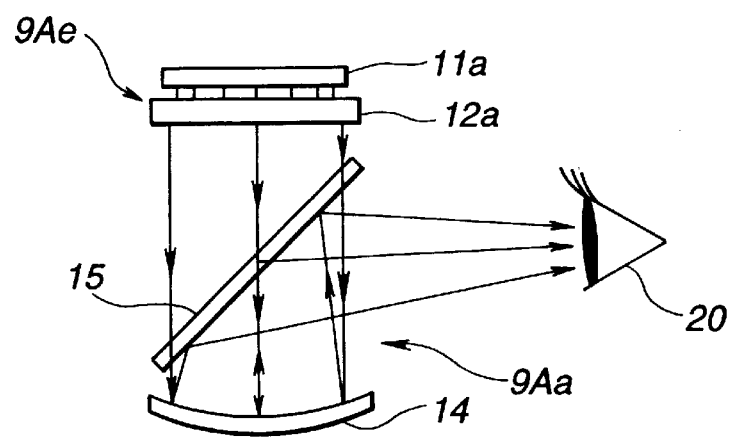
FIG. 24 is a side view of the LCD unit and an optical unit used in the image observation apparatus shown in FIG. 22, the view being a conceptual drawing showing light paths where light radiated by a back light and images displayed on the LCD unit reach at observer's eye.

FIG. 24 is a side view of the LCD unit 9Ae and optical unit 9Aa, and a conceptual drawing showing light paths along which irradiation the light radiated by the back light 11a and the image displayed on the LCD display part 12a reach at observer's eye 20.

As shown in FIG. 24, the optical unit 9Aa comprises a half mirror 15 and a convex mirror 14. On the upper surface of this optical unit 9Aa, the back light 11a and LCD display part 12a constructing the LCD unit 9Ae are provided. Further, the above-mentioned half mirror 15 is located at the angle of 45° against the irradiation light from the back light 11a.

In the modified example composed in this manner, the irradiation light from the back light 11a passes the LCD display part 12a, and is irradiated from the upper surface of the optical unit 9Aa to the lower side. Owing to this, the image displayed on the LCD display part 12a is illuminated by the irradiation light from the back light 11a.

Then, the image displayed on the LCD display part 12a passes the half mirror 15, enters to the convex mirror 14, and is condensed by this convex mirror 14. After that, the light reflects on the inclined surface of the back side of the half mirror 15, its path is folded, and the light enters into observer's eye 20. Therefore, observer's eye 20 can observe the image displayed on the LCD display part 12a.

In addition, operation of the modified example of the image observation apparatus that is constructed is approximately similar to that of the fourth embodiment.

Thus, the picture mode control circuit (refer to FIG. 18) reads the supplemental information defining the information regarding the picture mode stored in the memory means of the inserted game card, that is, the display aspect and the like. Further, the control circuit also switches arrangements of the LCD unit 9Ae by controlling the display unit driver on the basis of this supplemental information.

Thus, the picture mode control circuit, as shown in FIG. 22, controls the display unit driver by the supplemental information defining the display aspect of the read image, for example, the information expressing the aspect ratio of the screen to make the driver rotate the motor. In consequence, the control circuit makes the LCD unit rotation shaft 9Ab rotate toward the direction of the arrow B shown in FIG. 22. Owing to this, only the LCD unit 9Ae rotates toward the direction and becomes in the status shown by the dotted lines in FIG. 22. Therefore, the observer can observe the image in a long screen frame.

As described above, according to the modified example of the fourth embodiment, it is possible to obtain the effects quite similar to those of the fourth embodiment.

In addition, since only the LCD unit 9Ae is rotated in this modified example, it is possible to obtain the similar effects with smaller driving power in comparison with the case that the entire display unit 9 is rotated in the fourth embodiment. Further, since the rotating and moving members are small, smaller spaces are enough for the rotating and moving members, and hence, this example can contribute to miniaturization of the apparatus.

Further, in this modified example, it is possible to locate all the members for rotating and moving the LCD unit 9Ae at positions except the front of the display unit 9. Hence, it is better to use a negative type of LC shutter for the head-mounted image display unit, which is similarly to that for the fourth embodiment and superior in light proof characteristics. However, it is also possible to use a positive type of LC shutter. In this case, it is necessary for the controller and head-mounted image display unit to have the same construction as that of the first, second, and third embodiments, that is, outside-world-image change-over switches 2Bb and 1Bb.

Still more, in the fourth embodiment and its modified example, rotation of the display unit 9 or LCD unit 9Ae is performed by driving members such as the motor 10, but the present invention is not limited to this. For example, it can be acceptable that the motor 10 is deleted, an operation member such as a knob is fixed to the LCD unit rotation shaft, and this operation member is rotated manually.

Figure 25:
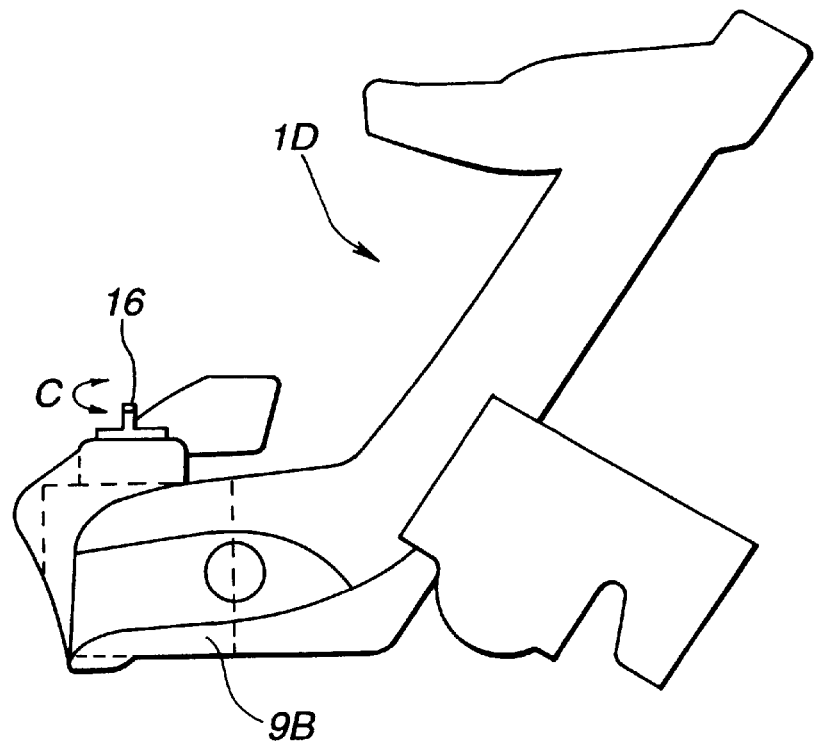
FIG. 25 is a drawing showing a modified example of the fourth embodiment of the present invention, the drawing being a schematic side view of the head-mounted image display unit.

FIG. 25 is a drawing showing another modified example of the fourth embodiment of the present invention, the drawing being a schematic side view of the head-mounted image display unit 1D. Further, FIG. 26 is a partially enlarged perspective view simply showing only one unit of display units constructing an image display unit for left and right eyes that is a component of the head-mounted image display unit.

Figure 26:
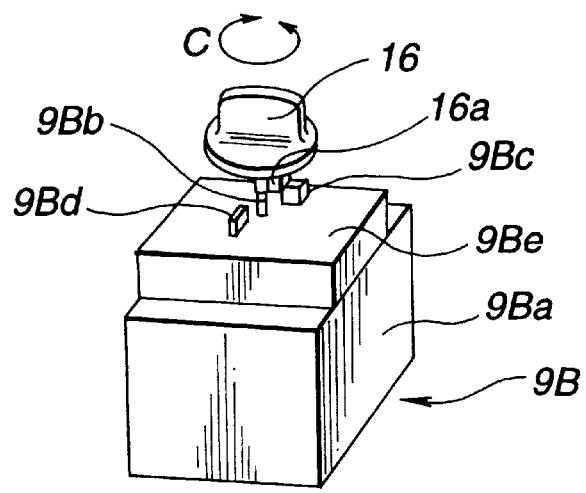
FIG. 26 is a partially enlarged perspective view simply showing only one side of display units constructing an image display unit of the head-mounted image display unit shown in FIG. 25.

In addition, also in FIG. 26, similarly to FIGS. 19 and 22, the image display unit of the head-mounted image display unit is composed of a pair of the similar component units, and hence, only one unit between display units constructing the image display unit for left and right eyes is shown, and another unit is omitted.

As shown in FIGS. 25 and 26, in this modified example, an operation member 16 such as a knob is provided on a display unit 9B located in the head-mounted image display unit 1D with freely rotating toward the directions of the arrow C shown in FIGS. 25 and 26.

The display unit 9B, similarly to the modified example of the display unit 9A, comprises an LCD panel and a back light. Thus, the display unit 9B comprises: the LCD unit 9Be, and an optical unit 9Ba for guiding a light beam, which forms the image displayed by this LCD unit 9Be, as the image to observer's eyes.

The optical unit 9Ba is fixed in the head-mounted image display unit 1D, and the LCD unit 9Be is located with freely rotating to the optical unit 9Ba. Thus, the LCD unit 9Be has an LCD unit rotation shaft 9Bb for rotating this LCD unit 9Be against the optical unit 9Ba, and this LCD unit rotation shaft 9Bb has a fixed operation member 16. In addition, in an approximately central portion of the LCD unit rotation shaft 9Bb, a protruding member 16a is provided in the direction orthogonal to the shaft direction of this LCD unit rotation shaft 9Bb.

Hence, by manually rotating the operation member 16 toward the directions of the arrow C, the LCD unit rotation shaft 9Bb rotates. However, since stopper members 9Bc and 9Bd are provided on the LCD unit 9Be with extruding, the above-mentioned extruding member 16a contacts to these stopper members 9Bc and 9Bd, and hence, rotation of the LCD unit rotation shaft 9Bb is limited.

Thus, the LCD unit rotation shaft 9Bb is not only allowed to rotate only within the range between the stopper members 9Bc and 9Bd, but also limited in its position by the stopper members 9Bc and 9Bd.

As described above, according to another modified example of the fourth embodiment, by controlling the aspect ratio of the display screen through rotating the LCD unit 9Be, an observer can observe the image data of the inserted game card in the optimum aspect ratio of the display screen. Therefore, the observer can enjoy games with better comfortableness and presence.

In addition, since rotation of the LCD unit 9Be can be optionally operated manually, it becomes possible to omit electric circuits such as the picture mode control circuit and display unit driver (refer to FIG. 18), and driving members such as the motor and reduction gear train. Further, the observer (operator) can optionally select the desired aspect ratio of the screen.

Furthermore, in this modified example, similarly to the above-mentioned modified example, it is possible to locate all the members for rotating and moving the LCD unit 9Be at positions except the front of the display unit 9. Hence, it is better to use a negative type of LC shutter for the head-mounted image display unit, which is similarly to that for the fourth embodiment and superior in light proof characteristics. However, it is also possible to use a positive type of LC shutter. In this case also, it is necessary for the controller and head-mounted image display unit to have the outside-world-image change-over switches 2Bb and 1Bb.

Next, a fifth embodiment of the present invention will be described below.

Figure 27:
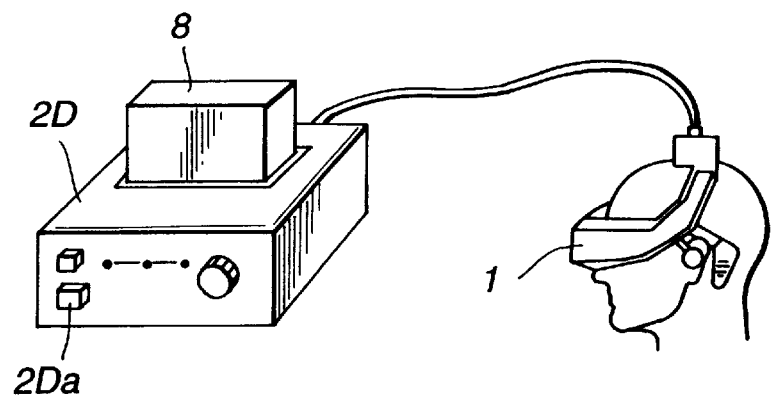
FIG. 27 is a conceptual drawing showing the structure of a fifth embodiment of the image observation apparatus according to the present invention.

FIG. 27 is a conceptual drawing showing the fifth embodiment of the image observation apparatus. In addition, this fifth embodiment of the image observation apparatus, similarly to the third and fourth embodiments, is an example of using this apparatus for playing a game and the like. Further, this embodiment is also an example of an image observation apparatus capable of changing picture quality of a display image and magnification of the image.

Furthermore, since this fifth embodiment fundamentally has the similar construction to those of the third and fourth embodiments, description of similar members will be omitted, and only the different members will be described below.

As shown in FIG. 27, this image observation apparatus comprises: a head-mounted image display unit 1 for displaying an image, derived from video signals supplied to itself, on an image display unit corresponding to a left eye and a right eye of an observer respectively; and a controller 2D, into which a game card 8 being a memory medium storing image data can be selectively inserted, and which performs operator's optional operation to the image data read from the game card 8, and supplies video signals, corresponding to the operated image data, to the head-mounted image display unit 1.

A picture quality change-over switch 2Da and the like are provided on a front.operation panel of the controller 2D, and two display aspects can be sequentially switched each time the switch 2Da is pushed. The two display aspects are, for example, as follows:
1) A low resolution mode in which an image is displayed in high magnification and low pixel density, and speed and power are given priorities (refer to FIG. 30).
2) A high resolution mode in which an image is displayed in low magnification and high pixel density, and high definition of the image is given a priority (refer to FIG. 31).

In addition, interlocking with this switching operation, a corresponding LED of a status display unit (omitted in FIG. 27; refer to FIGS. 10 and 14) on the operation panel of the controller 2D is lit.

Furthermore, although not shown in FIG. 27, an LC shutter driver and the like, which will be described below, are provided in the controller 2D, the LC shutter driver and the like which are controlled by a control circuit that controls the entire apparatus and is composed of a CPU and the like.

Figure 28:
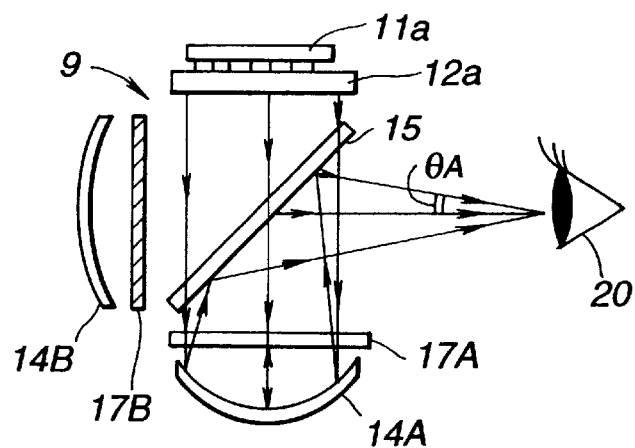
FIG. 28 is a schematic diagram showing the display unit constructing the image display unit of the head-mounted image display unit in the image observation apparatus shown in FIG. 27, the diagram showing the state of the display unit being set in a low resolution mode.
Figure 29:
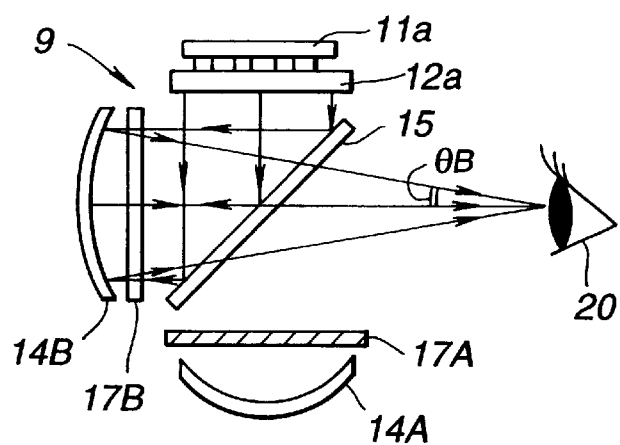
FIG. 29 is a schematic diagram showing the display unit constructing the image display unit of the head-mounted image display unit in the image observation apparatus shown in FIG. 27, the diagram showing the state of the display unit being set in a high resolution mode.

FIGS. 28 and 29 are schematic diagrams showing a display unit constructing an image display unit of the head-mounted image display unit 1 in this fifth embodiment of the image observation apparatus. FIG. 28 shows the state of the display unit being set in the low resolution mode, and FIG. 29 shows the state of the display unit being set in the high resolution mode.

As shown in FIGS. 28 and 29, the display unit 9 comprises: an LCD unit including a back light 11a and an LCD display part 12a; and an optical unit including a half mirror 15, a first concave mirror 14A, a second concave mirror 14B, a first LC shutter 17A, and a second LC shutter 17B.

In addition, it is assumed that the above-mentioned LCD unit is composed of the same members as those of the fourth embodiment, and hence, here, their description is omitted.

Further, the optical unit is provided with members for guiding to an observer's eye a light beam for displaying an image in a low resolution mode as one display aspect, that is, the half mirror 15, first concave mirror 14A, and first LC shutter 17A cutting off an unnecessary light beam. The members are located on the bottom of the optical unit. Still more, the optical unit is also provided with members for guiding to an observer's eye a light beam for displaying an image in a high resolution mode as another display aspect, that is, the half mirror 15, second concave mirror 14B, and second LC shutter 17B. The members are located in the side opposing to the position of the observer's eye 20 observing the display image.

In addition, the head-mounted image display unit 1 of this fifth embodiment, similarly to that of the fourth embodiment, has not a change-over switch for an outside-world image obtained with a see-through function and the like. Therefore, this embodiment uses a head-mounted image display unit having so-called negative types of LC shutters which are normally-closed and common.

Further, as described above, if a display image is observed by the above-mentioned display unit constructed in this manner, a picture quality mode is selected by pushing the picture quality change-over switch 2Da of the controller 2D. Operation in this case will be described below with reference to the flow chart in FIG. 32.

Figure 32:
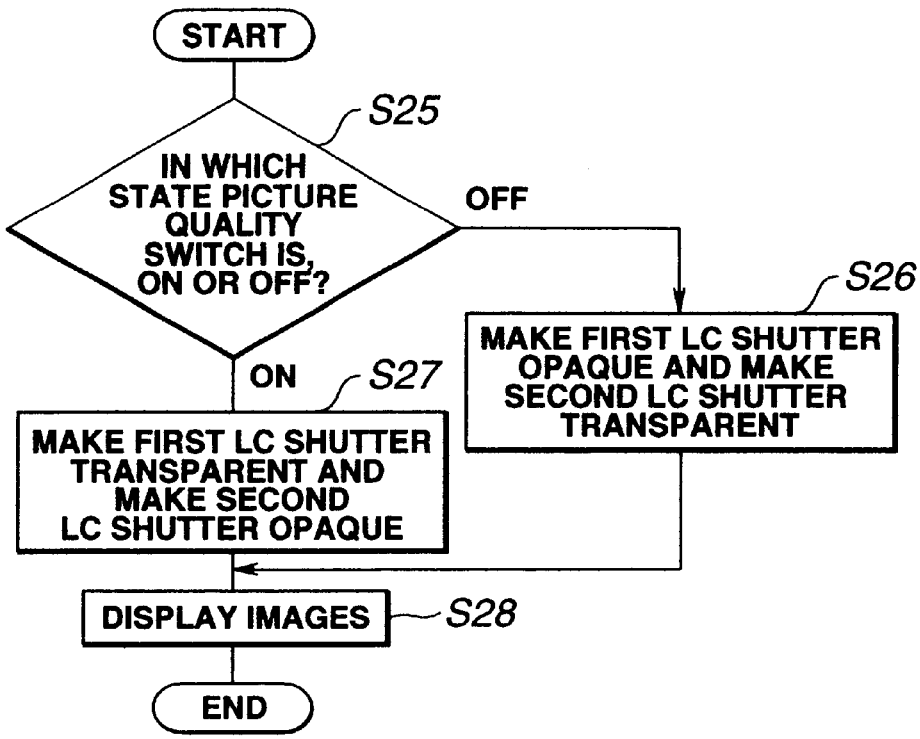
FIG. 32 is a flow chart showing operation performed when a picture quality mode is selected at the time of observing the images displayed by the image observation apparatus shown in FIG. 27.

As shown in FIG. 32, first, the status of the picture quality change-over switch 2Da is confirmed at step S25. Here, if the picture quality change-over switch 2Da is ON, it is determined that the low resolution mode (low picture quality mode) is selected, and the process goes to the next step S27. On the other hand, if the picture quality change-over switch 2Da is OFF, it is determined that the high resolution mode (high picture quality mode) is selected, and the process goes to the next step S26.

If, at the above-mentioned step S25, it is determined that the low resolution mode (low picture quality mode) is selected, and the process goes to the next step S27, an LC shutter driver in the controller 2D is driven at this step S27. Therefore, as shown in FIGS. 28 and 32, the second LC shutter 17B becomes opaque, incidence of the light beam to the second concave mirror 14B is obstructed, and the process goes to the next step S28.

At step S28, the image is displayed. Thus, the image, displayed on the LCD display part 12A in the status at step S27, is illuminated by the irradiation light of the back light 11a. Then, the light beam proceeds to the lower part of the optical unit, permeates the half mirror 15 and first LC shutter 17A that becomes transparent, and enters onto the first concave mirror 14A.

Then, the light beam entered onto the first concave mirror 14A is condensed by this first concave mirror 14A, proceeds toward the half mirror 15 again, and reflects on the inclined surface of the back side of this half mirror 15. Thus, the light beam, whose path is changed by the mirror 15, enters into the observer's eye 20.

Figure 30:
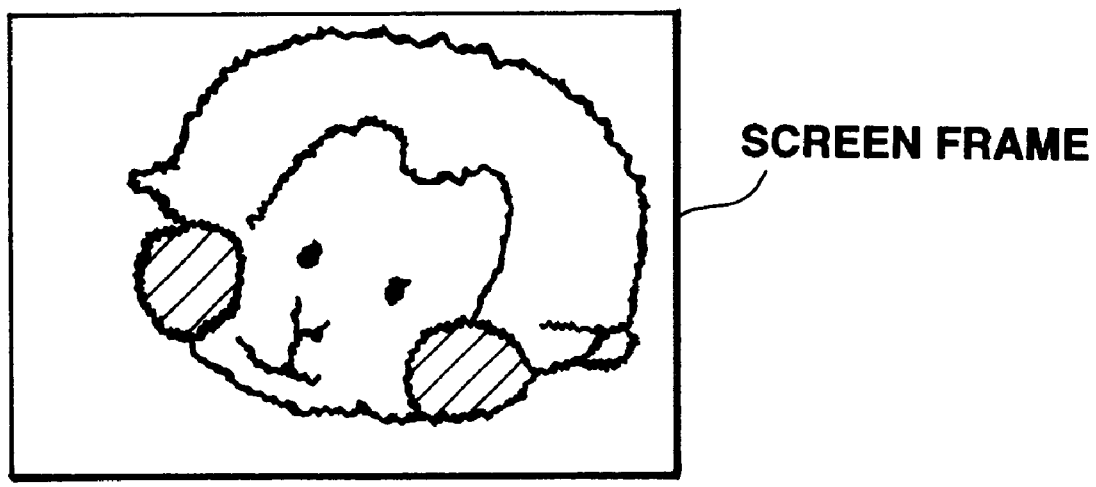
FIG. 30 is a drawing showing an example of display images being observed if the low resolution mode is set in the image observation apparatus shown in FIG. 27.

Owing to this, The observer's eye 20 can observe the image displayed on the LCD display part 12a. The image to be observed here, as shown in FIG. 30, is displayed in high magnification and low pixel density (low resolution) within the screen frame. Then, a series of steps is completed (END).

On the other hand, if it is determined at the above-mentioned step S25 that a high resolution mode is selected, and the process goes to step S26, the LC shutter driver in the controller 2D is driven similarly to the process at the above-mentioned step S27. Hence, as shown in FIGS. 29 and 32, the first LC shutter 17A becomes opaque, incidence of the light beam to the first concave mirror 14A is obstructed, and the process goes to the next step S28.

At step S28, the image is displayed. Thus, the image, displayed on the LCD display part 12a in the status at step S26, is illuminated by the irradiation light of the back light 11a. Then, the light beam proceeds to the lower part of the optical unit, and reflects on the top reflection surface of the half mirror 15. Then, the light beam, whose path is changed by the mirror 15, proceeds toward the second LC shutter 17B that becomes transparent, permeates this second LC shutter 17B, and enters onto the second concave mirror 14B.

Further, the light beam entered onto the second concave mirror 14B is condensed by this second concave mirror 14B, proceeds toward the half mirror 15 again, permeates this half mirror 15, and enters into the observer's eye 20.

Figure 31:
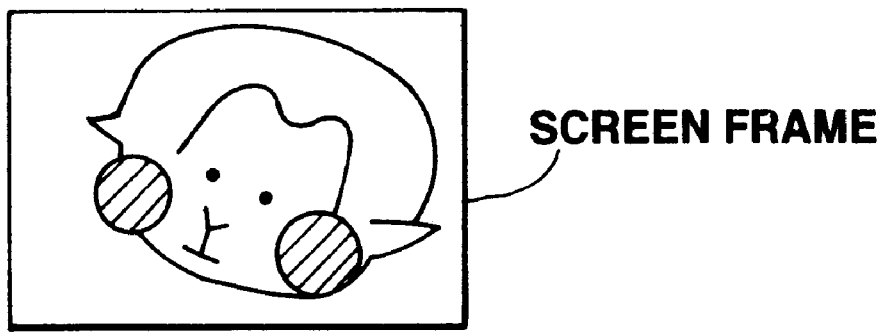
FIG. 31 is a drawing showing an example of display images being observed if the high resolution mode is set in the image observation apparatus shown in FIG. 27.

Owing to this, the observer's eye 20 can observe the image displayed on the LCD display part 12a. The image to be observed here, as shown in FIG. 31, is displayed in low magnification and high pixel density (high resolution) within the screen frame. Then, a series of steps is completed (END).

In addition, the curvature radius of the first concave mirror 14A is set to be less than that of the second concave mirror 14B. Here, let the angle between an optical axis and the light path be $\theta$, the angle being formed when the light path enters from the LCD display part 12a to the observer's eye 20. Further, let this angle in the low resolution mode shown in FIG. 28 be $\theta A$ and let it in the high resolution mode shown in FIG. 29 be $\theta B$. Then, the relation between both angles is $\theta A > \theta B$.

Here, as the angle $\theta$ becomes larger, an image with higher magnification can be displayed, and as the magnification becomes higher, the pixel number of the display image in the same area of screen frame becomes fewer. Thus, the image becomes in low resolution.

In this manner, by switching the first and second LC shutters 17A and 17B and changing the light path of the display image, it becomes possible to change the magnification of an image derived from the same video signal and to switch respective display aspects (picture quality modes).

In addition, preferably, the surfaces of the first and second LC shutters 17A and 17B, which face to the half mirror, may have nonreflective coating.

As described above, according to the fifth embodiment, by changing the light path of the display image in the display unit through switching the picture quality change-over switch 2Da of the controller 2D, it can easily performed to switch each display aspect (picture quality mode). Therefore, an observer (operator) can easily select the picture quality mode optimum for the game and the like to be observed, and hence, the observer can play the game with better comfortableness and presence.

In addition, although, in the fifth embodiment, a picture quality mode is selected by optionally switching the picture quality change-over switch 2Da of the controller 2D, the present invention is not limited to this. For example, it is conceivable to store also supplemental information defining the display aspect (in this case, a picture quality mode) like the fourth embodiment in addition to the image data as information stored in the memory means of a game card 8.

In this case, when the game card 8 is inserted into the controller 2D, the controller 2D not only detects insertion of the game card 8, but also reads the above-mentioned supplemental information from the memory means of the game card 8. Then, according to this supplemental information, a picture quality switching circuit in the controller 2D controls shading and permeation of the first and second LC shutters 17A and 17B included in the display unit of the head-mounted image display unit 1.

By adopting this construction, the controller 2D controls the LC shutters included in the display unit of the head-mounted image display unit 1 on the basis of the supplemental information, which relates to the picture quality mode and is stored in the game card 8. Therefore, it is possible to automatically set the picture quality mode.

Hence, an observer (operator) of a game and the like can observe image data of this inserted game card 8 in the optimum picture quality so long as the observer inserts the game card 8 into the controller 2D without special setting operation. Thus, the observer can play games with better presence.

Next, a sixth embodiment will be described below.

Figure 33:
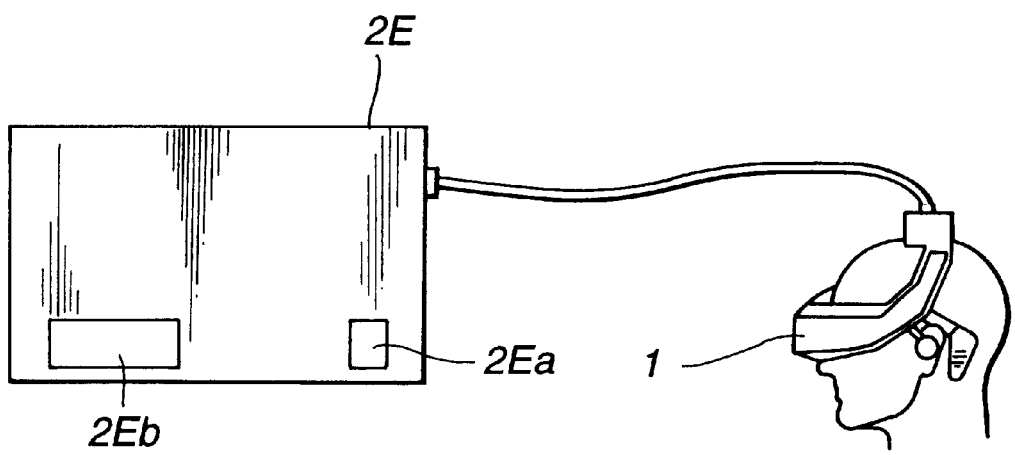
FIG. 33 is a conceptual drawing showing the structure of a sixth embodiment of the image observation apparatus according to the present invention.

FIG. 33 is a conceptual drawing showing this sixth embodiment of the image observation apparatus. In addition, this sixth embodiment is an example of automatically displaying images descriptive for using this image observation apparatus, that is, a so-called online manual and the like when the apparatus is turned on.

In addition, a head-mounted image display unit 1 and a controller 2E in this sixth embodiment of the image observation apparatus have construction fundamentally similar to that of the head-mounted image display unit and controller in each of the above-mentioned embodiments. Therefore, drawings and detailed description of the similar members will be omitted, and only the members relating to this sixth embodiment will be described below.

As shown in FIG. 33, this image observation apparatus comprises: a head-mounted image display unit 1 that is made to display images, derived from video signals supplied to itself, respectively on image display units corresponding to observer's eyes; and a controller 2E supplying video signals to the head-mounted image display unit 1.

The controller 2E includes: various types of circuits such as a control circuit having a CPU and controlling the entire image observation apparatus, a current detection circuit, and an LCD driver (not shown); a main power supply 2Ea; and memory means 2Eb such as ROM storing beforehand descriptive images for using this image observation apparatus, for example, image data (hereinafter called an online manual and the like) including the following descriptions:

1) A description of a method for inserting the head-mounted image display unit (refer to FIG. 34)
2) A description of a method for adjusting and setting the image display unit of the head-mounted image display unit (refer to FIG. 35)
3) A description regarding various types of setting of the head-mounted image display unit itself (pupil distance, parallax adjustment, etc.).

Figure 34:
FIG. 34 is a drawing exemplifying the image data of an online manual and the like that is stored in memory means in the controller of the image observation apparatus shown in FIG. 33, the drawing showing display images regarding the explanation of the mounting method of the head-mounted image display unit.
Figure 35:
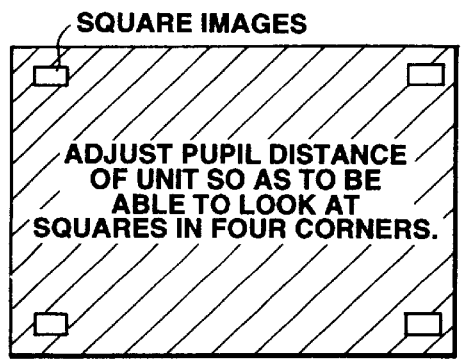
FIG. 35 is a drawing exemplifying the image data of an online manual and the like that is stored in memory means in the controller of the image observation apparatus shown in FIG. 33, the drawing showing display images regarding the explanation of the adjusting and setting methods of the head-mounted image display unit.

An example of the image data such as the online manual and the like stored in the memory means 2Eb is, as shown in FIG. 34, a display image regarding the description of a method for inserting the head-mounted image display unit (item 1 described above). Another example is, as shown in FIG. 35, a display image regarding the description of a method for adjusting and setting the image display unit of the head-mounted image display unit (item 2 described above).

Operation of the sixth embodiment of the image observation apparatus constructed in this manner will be described below with reference to a flow chart shown in FIG. 36.

Figure 36:
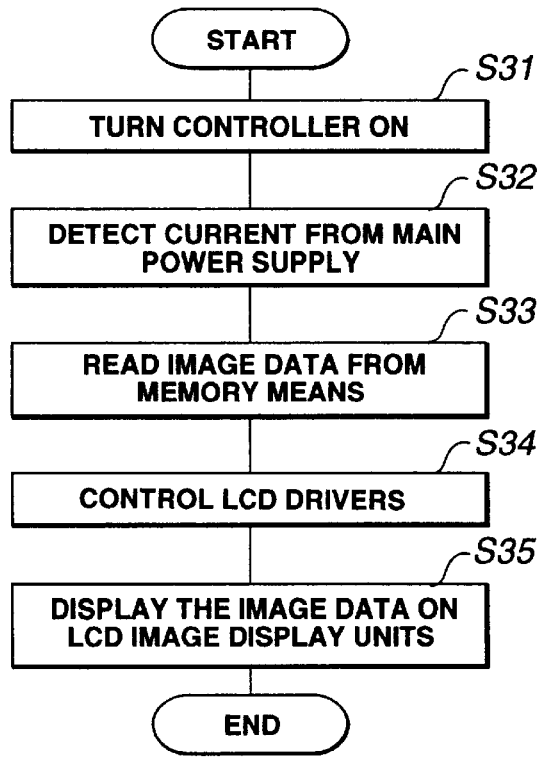
FIG. 36 is a flow chart showing the operation of the image observation apparatus shown in FIG. 33.

As shown in FIG. 36, first, by pushing a power switch and the like of the controller 2E at step S31, the main power supply 2Ea is turned on. Then, at step S32, detection of current from the main power supply 2Ea is started by a current detection circuit in the controller 1E. After current detected, the process goes to step S33, where the image data such as the online manual and the like stored in the memory means 2Ea is read, and thereafter, the process goes to the next step S34.

At step S34, an LCD driver in the controller 2E is controlled by control means, and drives an image display unit (LCD) of the head-mounted image display unit 1. At the next step S35, the image data read (FIGS. 34 and 35) at the above-mentioned step S33 is displayed on the image display unit, and a series of steps is completed (END).

As described above, according to the sixth embodiment, power-up of the controller 2E is detected, the image data and the like such as the online manual and the like stored in the memory means 2Ea is automatically read. Further, the read image data and the like are automatically displayed on the image display unit of the head-mounted image display unit 1. Therefore, it becomes unnecessary to read complicated manuals for confirmation, and hence, it is easily possible to simply use the image observation apparatus.

Further, in the sixth embodiment, data such as the online manual and the like stored in the memory means 2Ea of the controller 2E is stored as image data. However, the present invention is not limited to this, for example, it is also possible to store voice data and perform explanation with voice based on this voice data.

Next, a seventh embodiment of the present invention will be described below.

Figure 37:
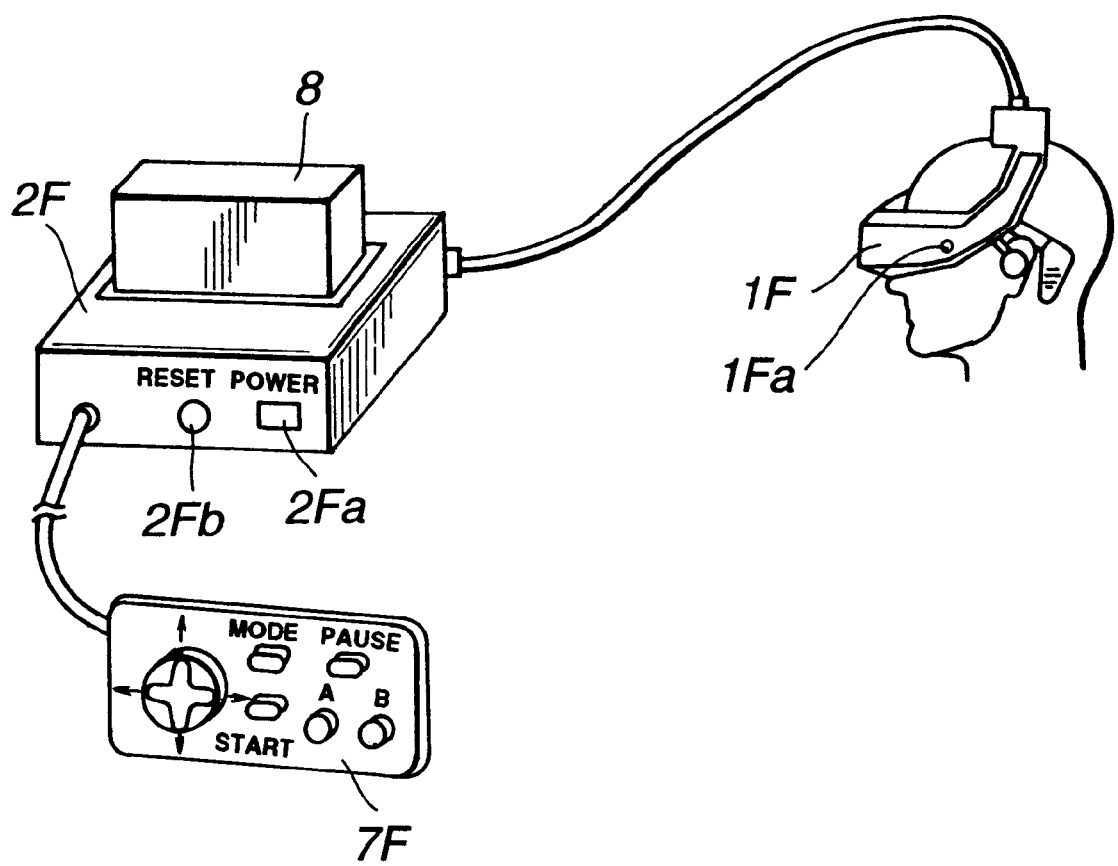
FIG. 37 is a conceptual drawing showing the structure of a seventh embodiment of the image observation apparatus according to the present invention.

FIG. 37 is a conceptual drawing showing this embodiment of the image observation apparatus. In addition, this seventh embodiment of the image observation apparatus, similarly to the third, fourth, and fifth embodiments, is an example of using this apparatus for playing a game and the like. Further, this embodiment is also an example of an image observation apparatus capable of reading guide information expressing an operation method regarding an image of a game and the like from a memory medium inserted in a controller, and performing display concerning to this guide information on a image display unit of a head-mounted image display unit on the basis of this guide information.

Furthermore, since this seventh embodiment fundamentally has the similar construction to those of the third and fourth embodiments, description of similar members will be omitted, and only the different members will be described below.

As shown in FIG. 37, this image observation apparatus comprises: a head-mounted image display unit 1F for displaying an image, derived from video signals supplied to itself, on an image display unit corresponding to a left eye and a right eye of an observer respectively; and a controller 2F, into which a game card 8 being a memory medium storing image data and guide information expressing the operation method regarding the image of a game and the like can be selectively inserted, and which supplies video signals, corresponding to the operated image data, to the head-mounted image display unit 1F through an operator operating image data with a control pad 7F that is operation means for the operator optionally operating image data read from the inserted game card 8.

Further, the controller 2F has a game card 8 that is selectively located in the attachable and detachable manner, and connects to the head-mounted image display unit 1F and control pad 7F.

Furthermore, similarly to the controller 2C in the fourth embodiment, a main power switch 2Fa switching the main power supply to ON or OFF and a reset switch 2Fb capable of initializing a game card 8, inserted into the controller 2C, regardless this main power switch 2Fa are located on the front operation panel of the controller 2F.

A game card 8 is provided with memory means (not shown) including memory such as ROM, the memory means storing image data and guide information expressing the operation method regarding the image of a game and the like.

The control pad 7F is provided with button switches that are plural sorts of operation members for performing various types of operation. For example, the following button switches are located:

1) START: A start button for instructing the start of image display (the game and the like)
2) "A" and "B": A selection button for instructing the selection of image display (the operation method of the game and the like)
3) Arrows: A cursor buttons for instructing the movement of cursors (characters and the like) on the screen. (In FIG. 37, a large round button having arrows radiating toward the circumference of the button is exemplified.)
4) MODE: A mode button for instructing the selection of an image display mode (game and the like)
5) PAUSE: A pause button for temporarily stopping image display (progress of the game).

In addition, a pause switch 1F$a$, having a function similar to the pause button of the control pad 7F, is located in the vicinity of both temples of the body constructing the head-mounted image display unit 1F. Hence, regardless the pause button of the control pad 7F, an operator can pause image display (progress of the game).

Operation for performing image display (or a game and the like) with the seventh embodiment of the image observation apparatus constructed in this manner will be described below.

First, when the main power switch 2F$a$ of the controller 2F is turned on, it is started to read the guide information expressing an operation method regarding the image of a game and the like from the memory means of a game card 8 inserted into the controller 2F. The guide information is sequentially read every one image from an address of the memory means in the game card 8.

Next, the image relating to this guide information is displayed on the image display unit of the head-mounted image display unit 1 on the basis of the read guide information. The display aspect in this time is controlled so that the image may be held for 3–5 seconds every one image by, for example, a time counter (not shown) provided in the controller 2F, and the subsequent images may be sequentially displayed.

Figure 39:
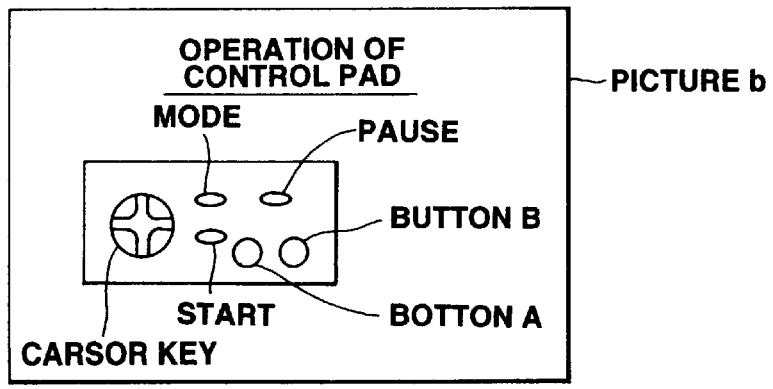
FIG. 39 is a drawing for explaining the operation of displaying images (a game and the like) that is performed by the image observation apparatus shown in FIG. 37, the drawing showing a display image regarding explanation of "operation of a control Pad" among display images regarding guide information.
Figure 40:
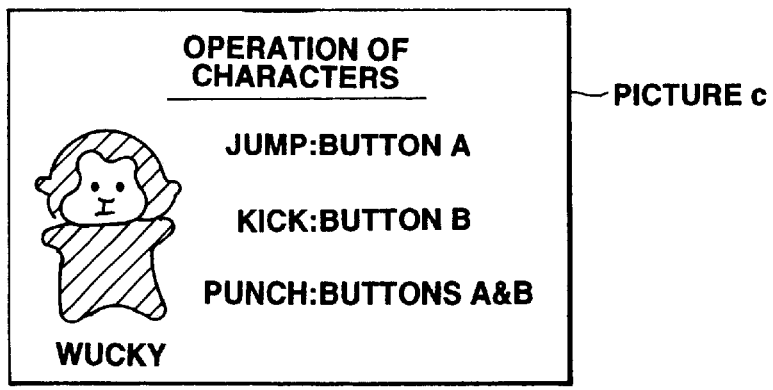
FIG. 40 is a drawing for explaining the operation of displaying images (a game and the like) that is performed by the image observation apparatus shown in FIG. 37, the drawing showing a display image regarding explanation of "operation of characters" among display images regarding guide information.

An example of the display relating to the above-mentioned guide information, as shown in FIG. 39, is the display image regarding the description of "operation of control pad". Another example, as shown in FIG. 40, is the display image regarding the description of "operation of characters".

Next, after a series of display relating to the guide information is performed, an observer can start the image display (the game and the like) by pushing the start button of the control pad 7F.

In addition, if the observer pushes the start button during performing the display relating to the guide information, the display relating to the guide information is interrupted, and then, the process moves to immediately start the image display (the game).

Further, with interlocking with a start command signal of the image display (the game and the like) by the start button of the control pad 7F, an LD shutter (not shown) constructing the image display unit (display unit) of the head-mounted image display unit 1F is shielded. On the other hand, if power supply to the controller 2F is cut off, and consequently, supply of a video signal to the head-mounted image display unit IF is cut off, the above-mentioned LD shutter automatically becomes transparent.

Furthermore, if it occurs that the operation method of the image display becomes unknown even during performing the image display using this image observation apparatus, the observer can refer to the above-mentioned guide information at any time.

Figure 38:
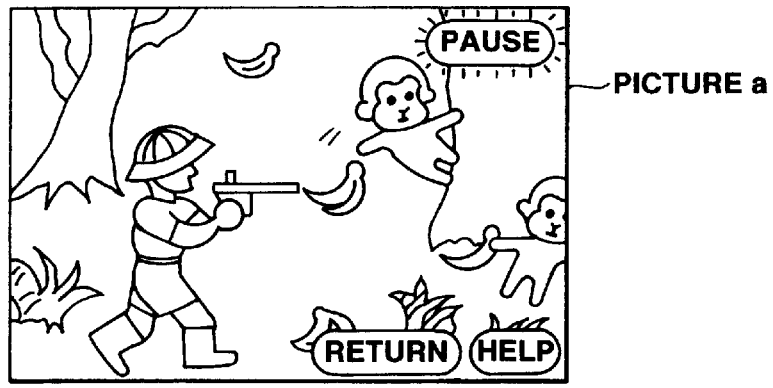
FIG. 38 is a drawing for explaining the operation of displaying images (a game and the like) that is performed by the image observation apparatus shown in FIG. 37, the drawing showing Picture "a" in the case that Pause button is pushed.

In this case, first, the observer pushes the pause button of the control pad 7F, or the pause switch 1F$a$ of the head-mounted image display unit 1. Then, as shown in FIG. 38, the display, showing that the pause button is pushed, that is, the display of "PAUSE" and the like appears at the predetermined positions with blinking for easy recognition. The display of "HELP", "RETURN", and the like appears at the predetermined positions, and the progress of the image display (the game and the like) is temporarily stopped. Next, the LC shutter of the image display unit in the head-mounted image display unit 1 becomes semitransparent (due to the superimposing function), and hence, the observer can see surroundings.

In this status, for example, by operating the cursor button of the control pad 7F, moving to the display "HELP" a pointer (not shown) on the screen, and thereafter, pushing the predetermined button such as the selection button "A" or "B", or the start button, the display "HELP" is selected.

Then, the display (refer to FIGS. 39 and 40) relating to the guide information that was read at the time of power-up is performed again.

Further, by pushing the pause button again, the observer can restart the image display (the game, etc.) from the stopped point at any time.

Furthermore, as a method for selecting the display "HELP", the above-mentioned example is that, by operating the cursor button of the control pad 7F, moving to the display "HELP" a pointer on the screen, and thereafter, pushing the predetermined button such as the selection button or start button, the display "HELP" is selected. However, the present invention is not limited to this because there are various ways. For example, it is conceivable that, by pushing the mode button, mode switching, that is, switching to the "HELP" mode is performed.

As described above, according to the seventh embodiment, the image data such as the guide information and the like stored in the memory means of the inserted game card 8 is automatically read at the time of power-up to the controller 2F. Further, the read image data is automatically displayed on the image display unit of the head-mounted image display unit 1. Therefore, it becomes unnecessary to read complicated manuals of game card 8 for confirmation, and hence, it is easily possible to simply use the image observation apparatus.

Further, even in the middle of image display (a game, etc.), it is possible to easily refer to the display relating to the guide information by pausing the image display (the game etc.) without ending the image display (the game etc.). Furthermore, it is also possible to immediately restore the paused image display (the game, etc.), and hence, an observer can continue the game comfortably.

Still more, the LC shutter of the image display unit in the head-mounted image display unit 1 is made to be opaque with interlocking with the start button. Therefore, the observer can be absorbed in the world of the display image (the game, etc.) without minding the surroundings if the observer is enjoying the image display (the game etc.). In addition, the LC shutter is also made to be semitransparent with interlocking with the pause button. Hence, the observer can easily see the surroundings by only pushing the pause button of the control pad 7F or the pause switch 1F$a$ of the head-mounted image display unit 1.

Next, an eighth embodiment will be described below.

Figure 41:
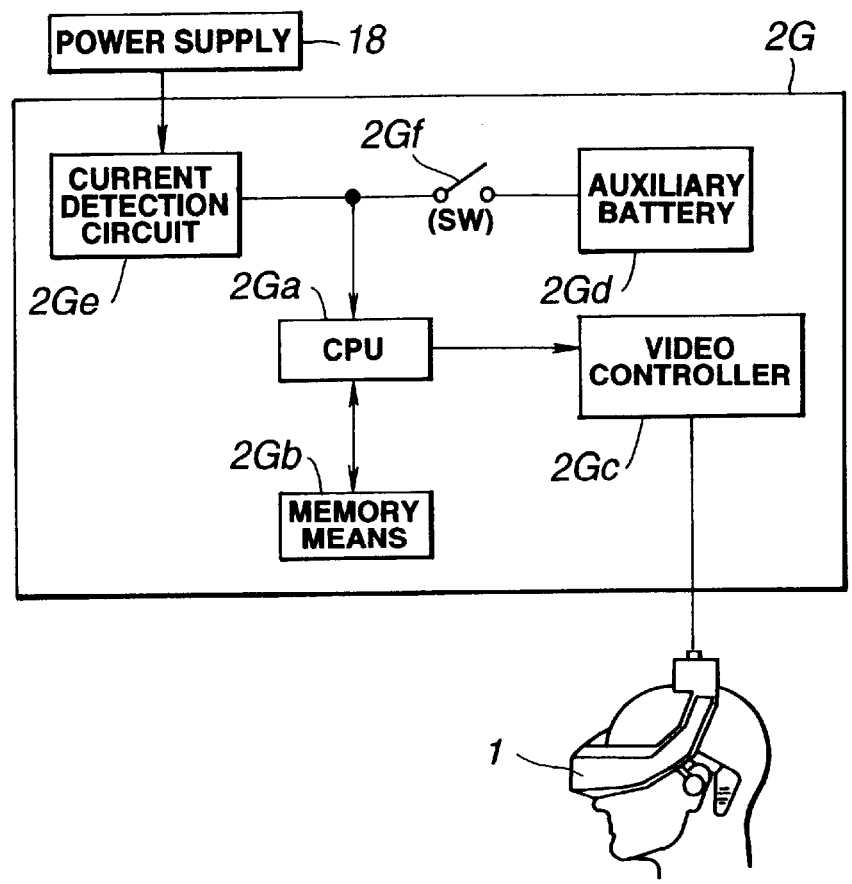
FIG. 41 is a conceptual drawing showing the structure of a eighth embodiment of the image observation apparatus according to the present invention.

FIG. 41 is a schematic block diagram showing this eighth embodiment of the image observation apparatus. In addition, this eighth embodiment of the image observation apparatus, similarly to the third, fourth, fifth, and seventh embodiments, is an example of using this apparatus for playing a game and the like. Further, this embodiment is also an example of the image observation apparatus that can store the status at the time, when power supply is interrupted, without the game being interrupted because of provision of an auxiliary power supply in the controller even if the power supply is interrupted due to, for example, power failure.

Furthermore, since this eighth embodiment fundamentally has the similar construction to those of the third, fourth, fifth, and seventh embodiments, description of similar members will be omitted, and only the different members will be described below.

As shown in FIG. 41, this image observation apparatus comprises: a head-mounted image display unit 1 for displaying an image, derived from video signals supplied to itself, on an image display unit corresponding to a left eye and a right eye of an observer respectively; and a controller 2G for performing operator's optional operation to the image data read from an inserted memory medium, and supplying video signals, corresponding to the operated image data, to the head-mounted image display unit 1.

The controller 2G includes: a control circuit 2Ga for controlling the entire apparatus and having a CPU; memory means 2Gb having memory; a current detection circuit 2Ge for detecting the current from an external power supply 18; an auxiliary battery 2Gd that is an auxiliary power supply; an auxiliary battery change-over switch 2Gf for switching to the auxiliary battery 2Gd so that power may be supplied from the auxiliary battery 2Gd if the power supply from the external power supply 18 is interrupted; and a video controller 2Gc for sequentially reading image data stored in a memory medium (not shown), converting it into video signals, and outputting the converted video signals to the head-mounted image display unit 1.

The power of the controller 2G is supplied from the external power supply 18. During using this image observation apparatus, that is, during the power being supplied from the external power supply 18, the current detection circuit 2Ge continues to detect the current from the external power supply 18.

Figure 42:
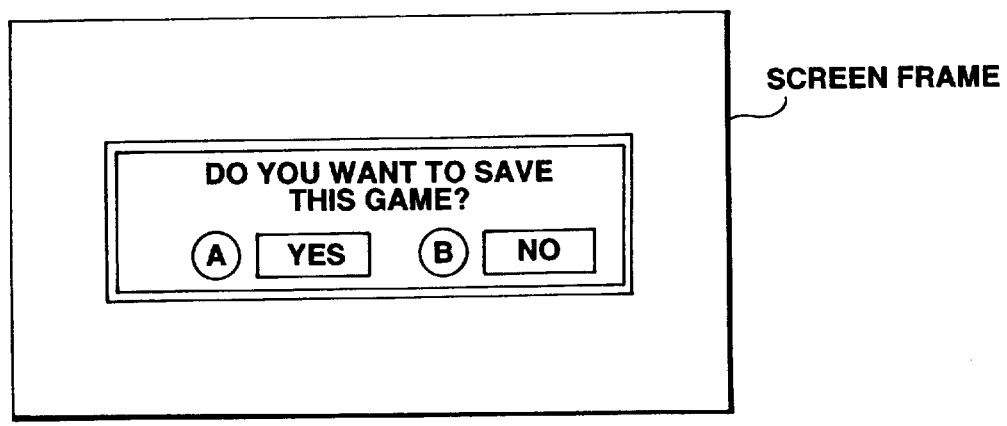
FIG. 42 is a drawing showing image data of a "game saving" confirmation screen that is stored in memory means included in a controller of the image observation apparatus shown in FIG. 41.

In addition, the memory means 2Gb in the controller 2G stores the image data that is a confirmation picture of "game saving" as shown in FIG. 42.

Figure 43:
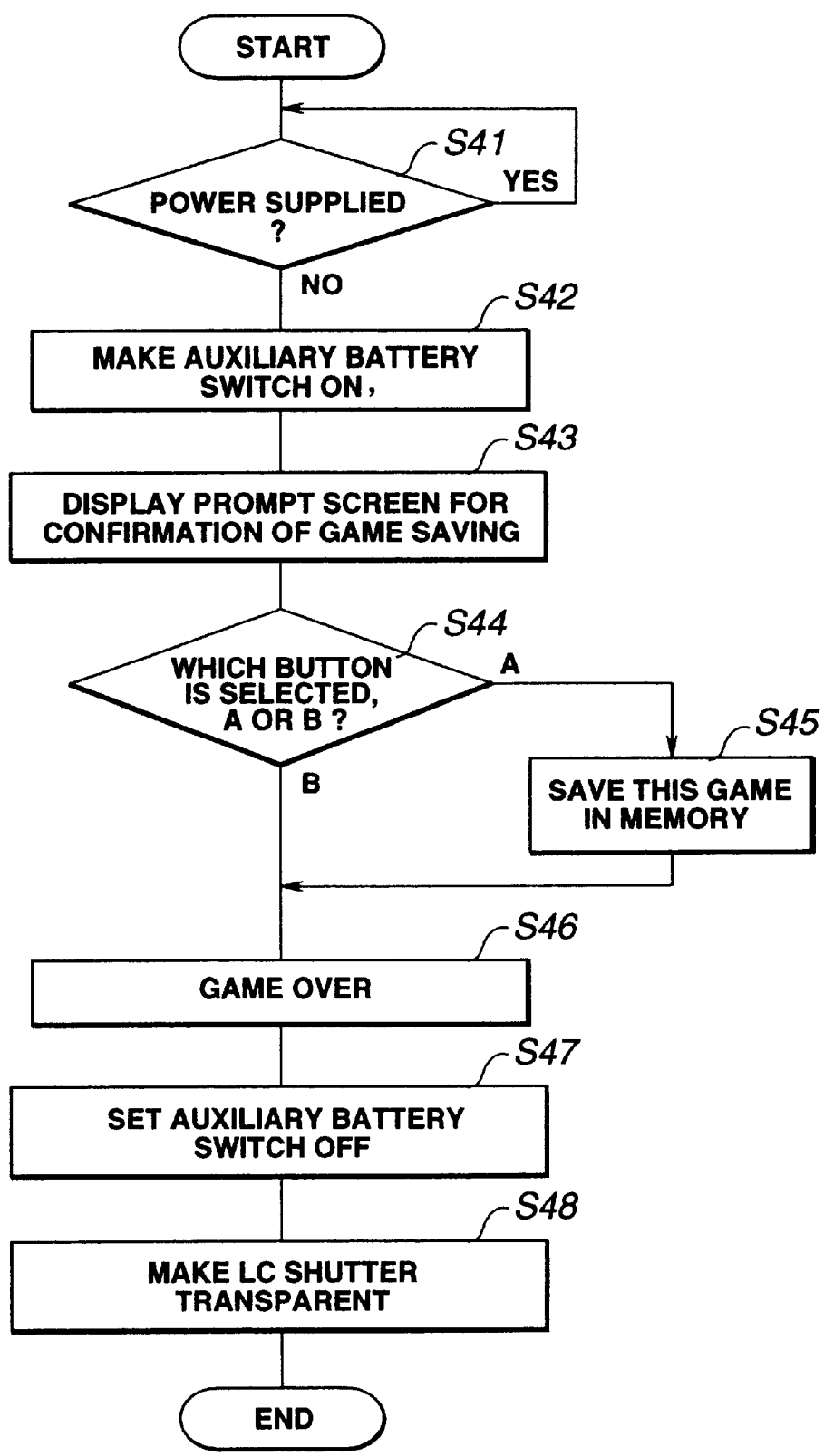
FIG. 43 is a flow chart showing the operation of the image observation apparatus shown in FIG. 41.
Figure 44:
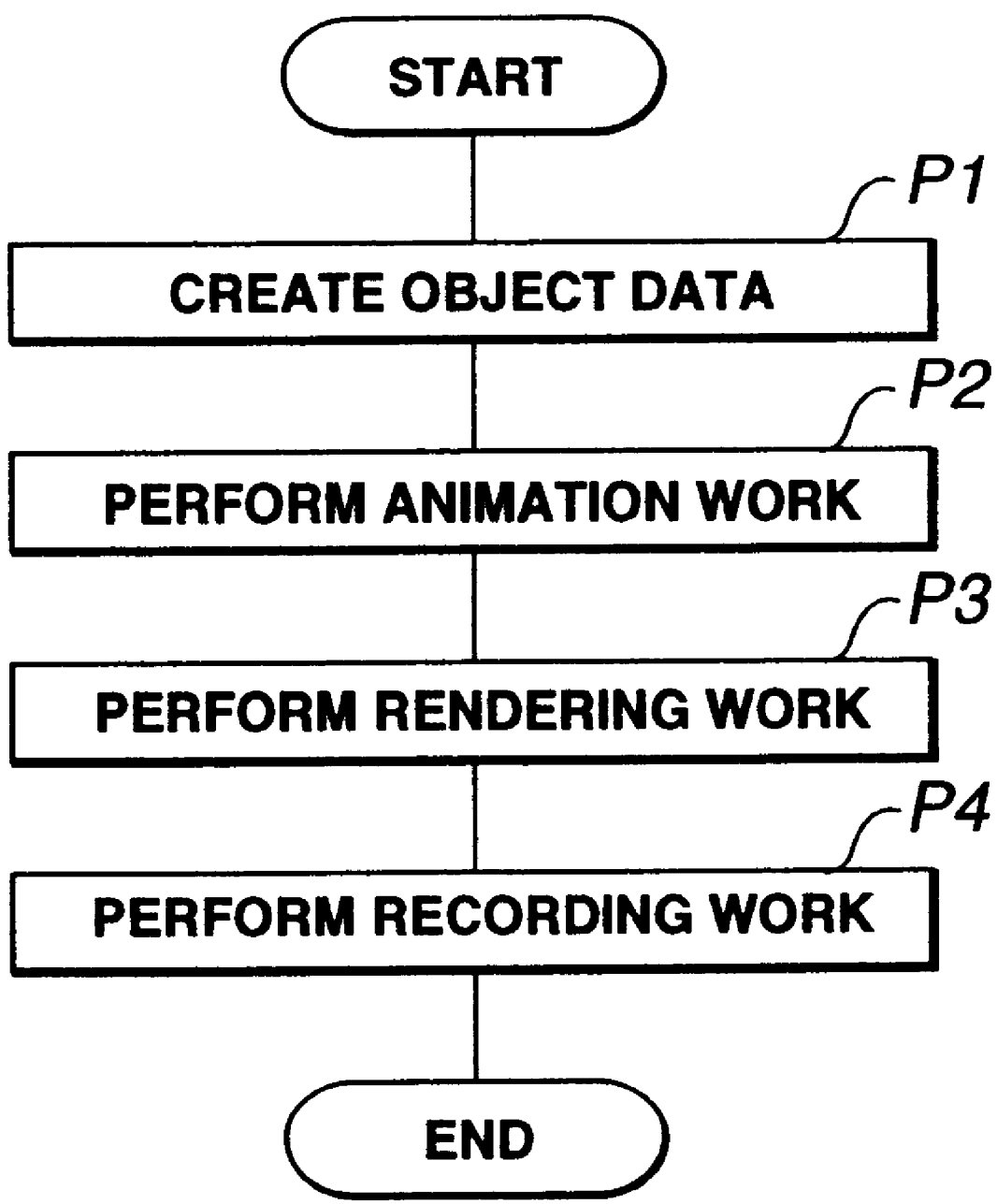
FIG. 44 is a flow chart showing a conventional work flow for performing the production of 3D images.
Figure 45:
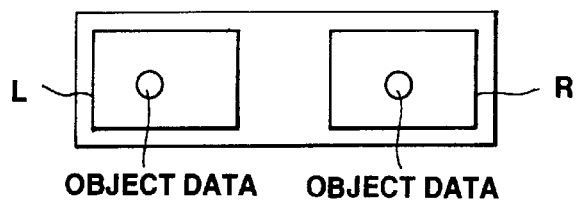
FIGS. 45 and 46 are conceptual drawings for explanation of 3D images using a binocular parallax.
Figure 46:
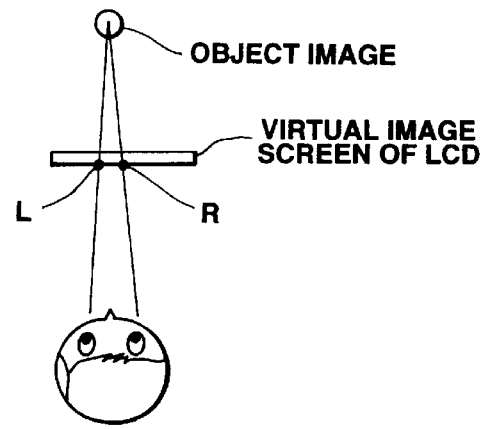
Figure 47:
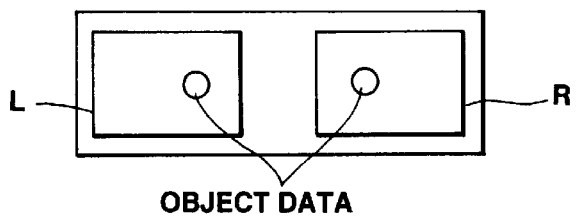
FIGS. 47 and 48 are other conceptual drawings for explanation of 3D images using a binocular parallax.
Figure 48:
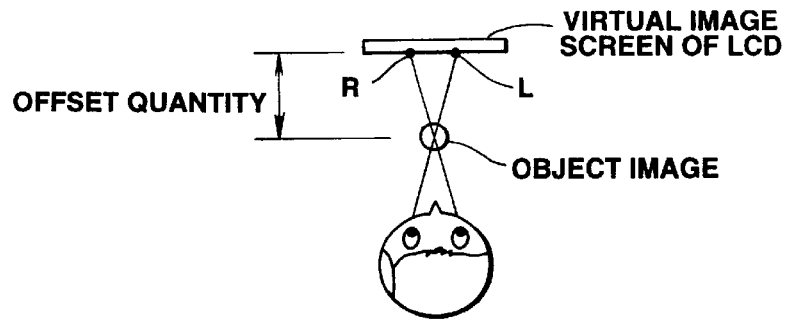
Figure 49:
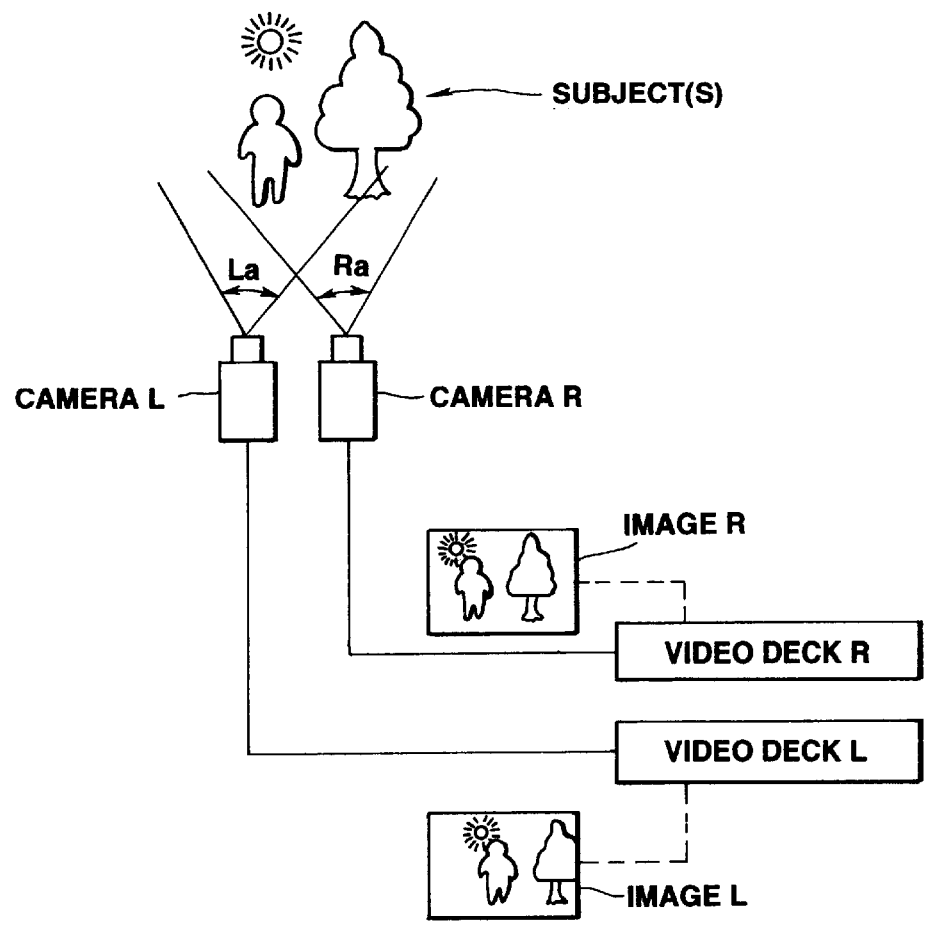
FIG. 49 is a conceptual drawing showing the operation of image-sensing of basic data in a conventional object data creation process.
Figure 50:
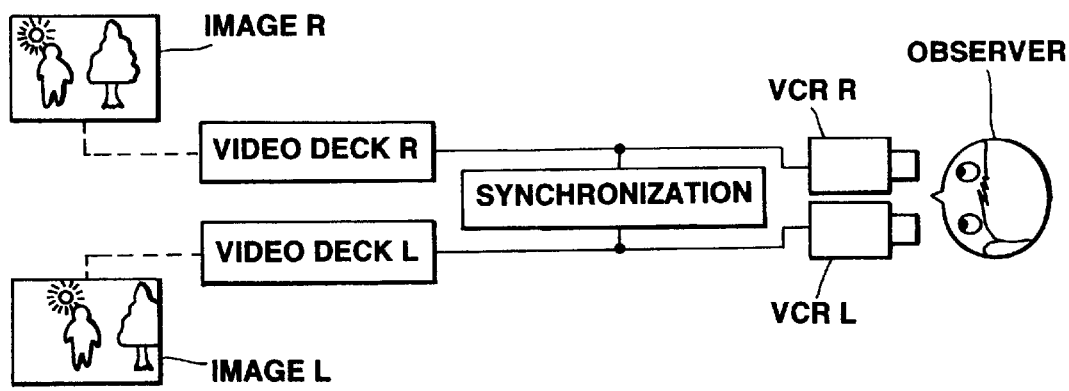
FIG. 50 is a conceptual drawing showing the operation of 3D image confirmation that is performed at the time of conventional motion picture creation.
Figure 51:
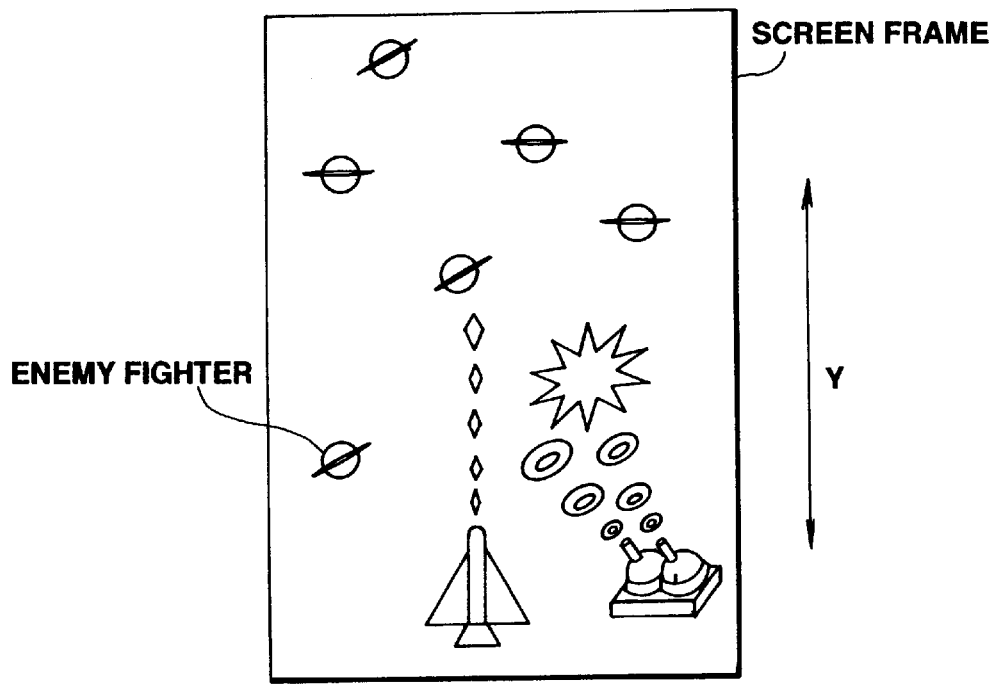
FIG. 51 is a drawing for exemplifying a display image showing an example of conventional games, the drawing showing a game proceeding by a display screen scrolling vertically (Y arrow directions)
Figure 52:
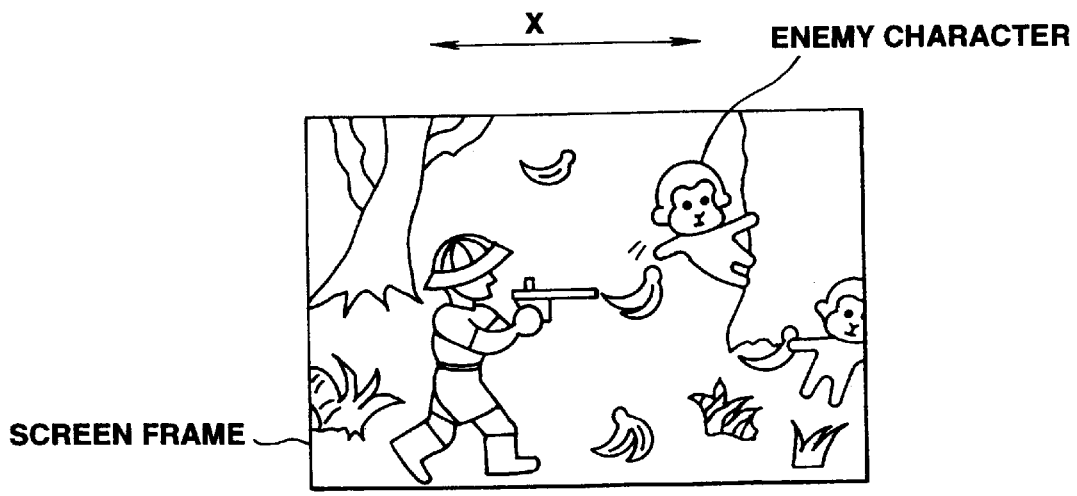
FIG. 52 is a drawing for exemplifying a display image showing an example of conventional games, the drawing showing a game proceeding by a display screen scrolling transversely (X arrow directions).

The operation of the eighth embodiment of the image observation apparatus constructed in this manner will be described below with reference to the flow chart in FIG. 43.

As described above, during using this image observation apparatus, the current detection circuit 2Ge continues to detect the current from the external power supply 18. However, at step S41 in FIG. 43, if the power supply from the external power supply 18 is interrupted due to an accident such as power failure and to misoperation with which a main power switch (not shown) is turned off, that is, if the interrupt of the power supply is detected by the current detection circuit 2Ge, the process goes to step S42.

At step 42, the current detection circuit 2Ge controls the auxiliary battery change-over switch 2Gf through the control circuit 2Ga so that the power can be immediately supplied from the auxiliary battery 2Gd. Thus, the current detection circuit 2Ge turns the change-over switch 2Gf on, and the process moves to the next step S43.

The control circuit 2Ga controls the video controller 2Gc at step S43, and reads from the memory means 2Gb the image data containing the confirmation picture of "game saving" (refer to FIG. 42). After that, the control circuit 2Ga converts the image data into video signals, and displays the video signals on the image display unit of the head-mounted image display unit 1. Then the process goes to the next step S44.

At step S44, this embodiment instructs the observer to select a selection button "A" or "B" that is an operation member on a control pad (not shown; refer to FIG. 37). Here, if the selection button "A" ("YES") is pushed, that is, if the game is ended after game saving, the process goes to step S45. At this step S45, the progress status and the like of the game played until the time when the power supply was interrupted are stored (saved) in the memory means 2Gd. After the game is ended at the next step S46, the process goes to step S47.

In addition, if the selection button "B" ("NO") is pushed at step S44, that is, if the game is ended without game saving, the process goes to step S47.

At step S47, the auxiliary battery change-over switch 2Gf is turned off. Further, at the same time as this power-down, an LC shutter constructing a display unit of the image display unit in the head-mounted image display unit 1 is driven by an LCD driver (not shown) at step S48. Hence, the shutter becomes transparent, and thereafter, a series of steps is completed (END). Further, in this case, it is preferable to adopt a positive type of LC shutter, which becomes transparent without applying a voltage, as the LC shutter of the head-mounted image display unit 1.

As described above, according to the above-mentioned eighth embodiment, the auxiliary battery 2Gd is provided in the controller 2G. Therefore, if the power supply is interrupted due to the power failure, etc., the current detection circuit 2Ge detects the interrupt, and the power is supplied from the auxiliary battery 2Gd. Hence, it is possible to securely save and protect the status at the time when the power supply is interrupted, and the progress status of the game without interrupting the game and the like in progress. Therefore, when the power supply is restarted, it is possible to restart the game and the like continuously from the status at the time when it was interrupted.

It is apparent that it is possible to construct embodiments different in a wide range according to the present invention without departing from the sprit and scope thereof. The scope of the present invention should not limited to the embodiments described and should instead be defined by the accompanying claims.

What is claimed is:

1. A head mounted image observation apparatus comprising:
   a head-mounted image display unit for displaying images derived from video signals supplied thereto, said head-mounted image display unit having a right eye image display unit corresponding to an observer's right eye and a left eye image display unit corresponding to an observer's left eye; and
   a controller into which a memory medium storing image data having a binocular parallax can be selectively inserted, said controller supplies video signals to said head-mounted image display unit directly through a predetermined cable without any other circuit or device connected therewith;
   wherein each of said right eye and left eye image display units includes;
      an image source;
      a first mirror for producing the image at the low resolution; and a second mirror producing the images at the high resolution.

2. A head mounted image observation apparatus comprising: a head-mounted image display unit for displaying images derived from video signals supplied thereto, said head-mounted image display unit having a right eye image display unit corresponding to an observer's right eye and a left eye image display unit corresponding to an observer's left eye; a controller into which a memory medium storing image data having a binocular parallax can be selectively inserted, said controller supplies video signals to said head-mounted image display unit directly through a predetermined cable without any other circuit or device connected therewith; wherein each of said right eye and left eye image display units further include: an image source, a first mirror for producing the image at the low resolution; a second mirror producing the images at the high resolution; a half mirror disposed between the image source and the first and second mirrors; a first liquid crystal shutter disposed between the half mirror and the first mirror; and a second liquid crystal shutter disposed between the half mirror and the second mirror, wherein the first liquid crystal shutter is opaque when the right and left eye image display units are in the high resolution configuration and wherein the second liquid crystal shutter is opaque when the right and left eye image display units are in the low resolution configuration.

\* \* \* \* \*